United States Patent [19]

Zushi et al.

[11] 4,295,027

[45] Oct. 13, 1981

[54] MICROWAVE OVENS WITH PROGRAMMABLE CONTROL

[75] Inventors: Sadao Zushi, Fuji; Yoshio Oida, Funabashi, both of Japan

[73] Assignee: Tokyo Shibaura Electric Co., Ltd., Kawasaki, Japan

[21] Appl. No.: 113,050

[22] Filed: Jan. 17, 1980

Related U.S. Application Data

[63] Continuation of Ser. No. 887,221, Mar. 16, 1978, abandoned.

[30] Foreign Application Priority Data

Mar. 18, 1977 [JP] Japan ................................. 52-30106
Mar. 18, 1977 [JP] Japan ................................. 52-30107
Mar. 18, 1977 [JP] Japan ................................. 52-30108

[51] Int. Cl.³ .......................................... H05B 9/06
[52] U.S. Cl. .............................. 219/10.55 B; 219/506
[58] Field of Search ......................... 219/10.55 B, 506

[56] References Cited

U.S. PATENT DOCUMENTS 3,819,906  6/1974  Gould, Jr. ........................... 219/506
4,011,428  3/1977  Fosnough et al. ............ 219/10.55 B

FOREIGN PATENT DOCUMENTS 47-21731 10/1972 Japan.
51-19754 5/1976 Japan.

OTHER PUBLICATIONS

*Electronics;* vol. 49, No. 25, pp. 105-110, 12/9/76; "Single-Chip Microprocessor Rules the Roast"; By B. Bell and D. Ogden.

*Appliance Manufacturer,* Cahners Publications, Jul. 1975 pp. 33-35; "Amana's Oven with a Brain".

*TMS 1117 IL 4-Bit Microcomputer Preprogrammed Microwave Oven Controller Manual,* Texas Instruments Inc., 1976, pp. 1-7.

*Primary Examiner*—Gene Z. Rubinson
*Assistant Examiner*—Keith E. George
*Attorney, Agent, or Firm*—Oblon, Fisher, Spivak, McClelland & Maier

[57] ABSTRACT

The microwave oven is provided with a main control circuit including an input mechanism of an information regarding a cooking time, a heat output level, foodstuff temperature, and the like, the main control circuit controlling the cooking operation in accordance with the predetermined operating condition represented by the input information and a magnetron energized by the output of the main control circuit.

15 Claims, 47 Drawing Figures

F I G. 4
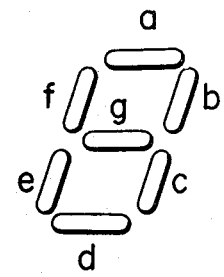
F I G. 5
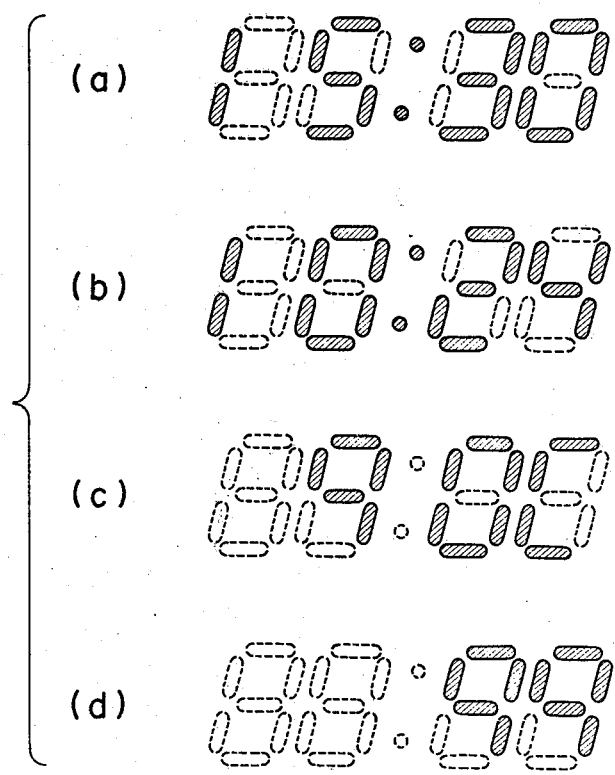

F I G. 10
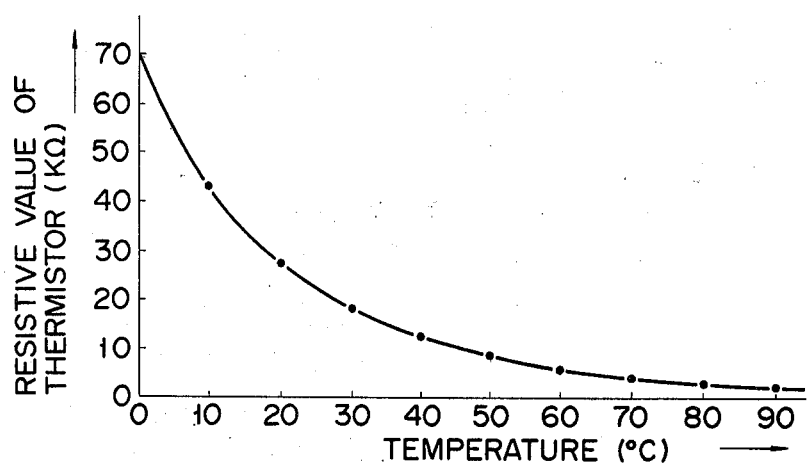
F I G. 11
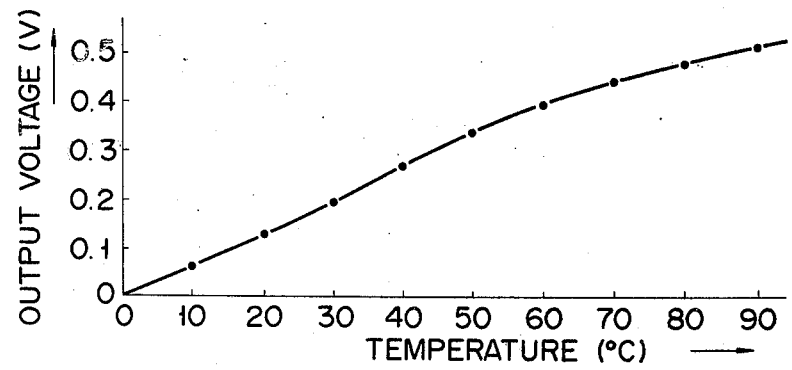

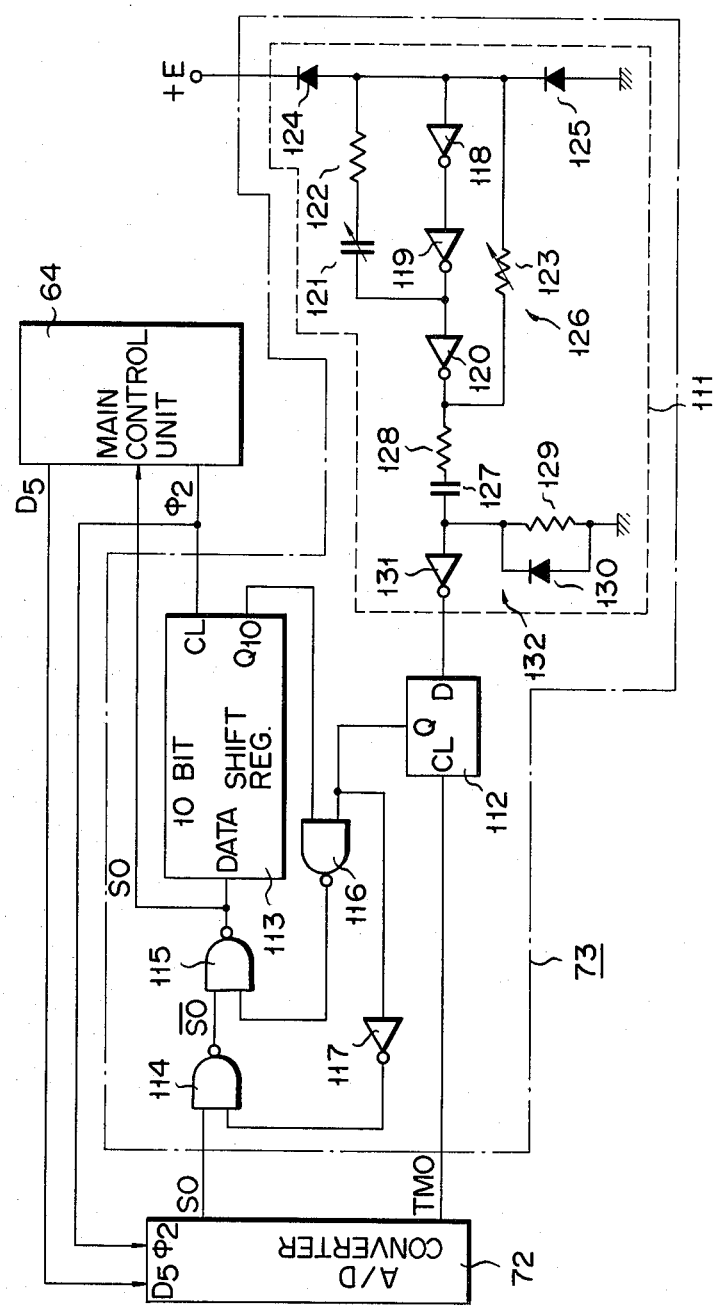
F I G. 15

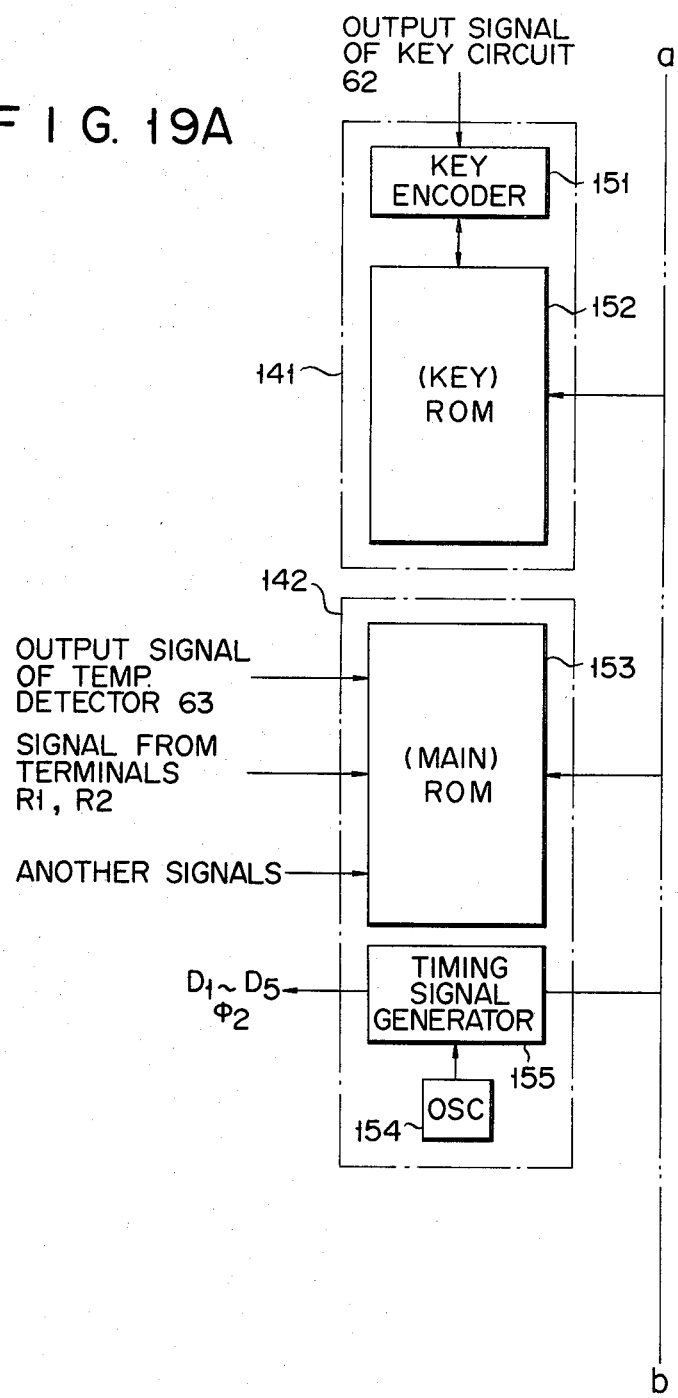

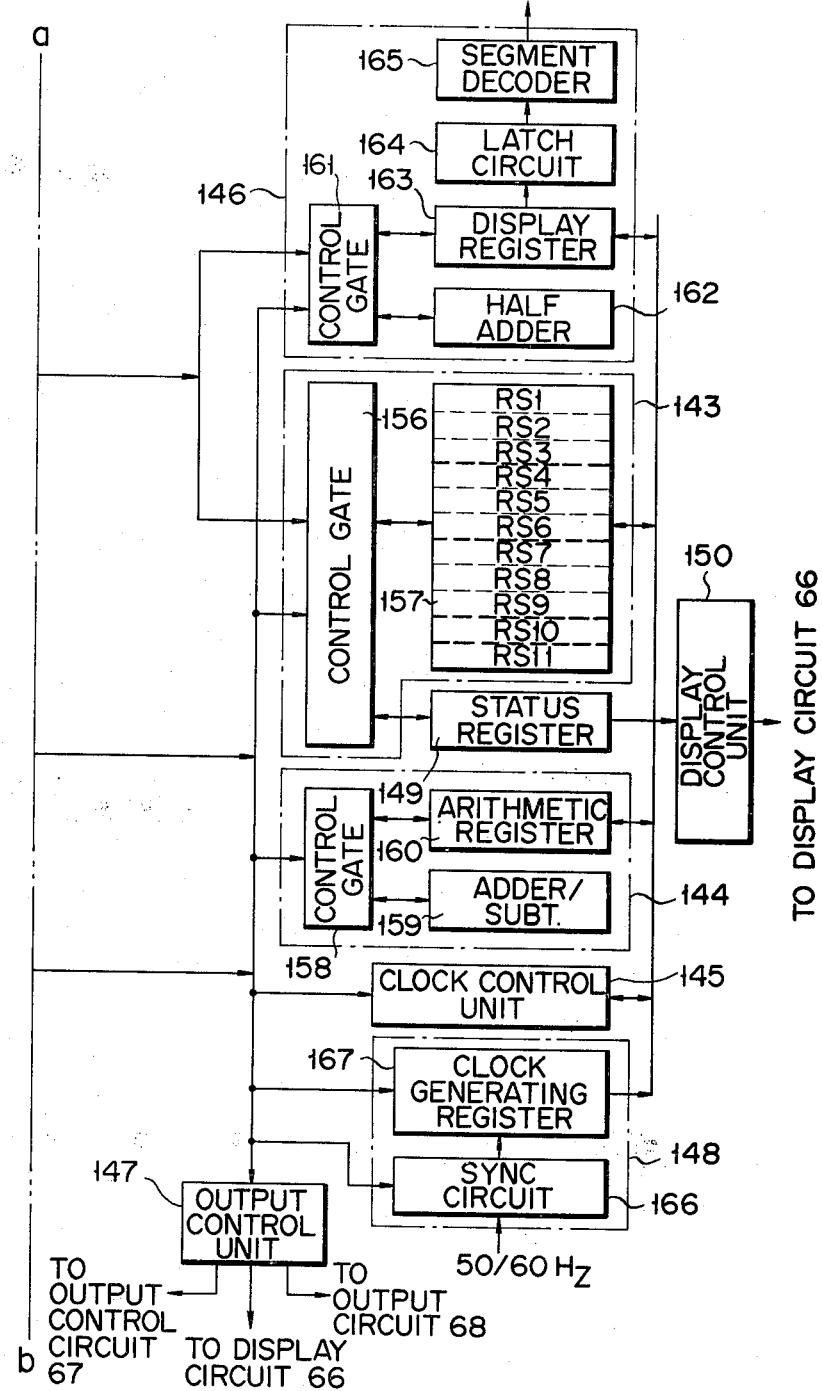

MICROWAVE OVENS WITH PROGRAMMABLE CONTROL

This is a continuation of application Ser. No. 887,221, filed Mar. 16, 1978 now abandoned.

This invention relates to a microwave oven in which foodstuffs are heated or cooked by using a microwave having a frequency of about 2450 MHz, and more particularly to a microwave oven whose operation is controlled digitally.

In a microwave oven, a mechanical timer is generally used as a means for setting the heating time and the level of the high frequency heat output is not controlled, or even controlled in only two stages of "high" and "low" by means of an independent timer. Generally, there are only two heating functions is, for example, two heating intervals under a constant output. Even when a member of heating functions are provided they are performed individually and independently of a timer. For this reason, the adjustment, operation and handling are extremely inconvenient and troublesome not only during manufacturing but also during the actual use. Moreover, the setting of the operating condition is troublesome and the range of setting is also limited. In addition, accurate and correct control can not be performed smoothly.

Accordingly, it is an object of this invention to provide an improved microwave oven in which various operations such as a predetermined time heating function effected by the combination of a set time and an output level, predetermined temperature heating function effected by the combination of a set temperature and an output level and a temperature preserving heating function effected by the combination of a preset temperature and time can be effected individually or sequentially by merely setting such operating conditions as the heating time, the heating power output level and the foodstuff temperature and wherein the operating condition can be set at any time by simple operation, the contents of the setting and the operating conditions of respective functions can be displayed digitally whereby the inconvenience described above regarding the adjustment, operation and handling can be eliminated and the operating conditions of respective heating functions can be controlled while observing the conditions.

According to this invention there is provided a microwave oven comprising a casing; a heating chamber; a door provided at an opening of the heating chamber; a magnetron for supplying a microwave energy to the heating chamber; a source circuit for energizing the magnetron; key means provided at the front part of the casing and including numeral keys, function keys including at least a time key, a temperature key and a power key; a start key and a clear key; digital control logic means for encoding an operation condition determined in response to the operation of the function key and numeral keys in said key means selectively operated by users; memory means having at least three areas for memorizing the encoded operation condition regarding the time, temperature and power encoded by the digital control logic means; display means for displaying digitally the operation condition encoded by said digital control logic means; operation means for intiating an operation thereof in response to the operation of said start key to energize said magnetron based on the operation condition memorized in said memory means; and control means for controlling said source circuit in response to an output signal of said operation means.

This invention can be more fully understood from the following detailed description when taken in conjunction with the accompanying drawings, in which:

FIG. 4 shows an arrangement of digit display segments;

FIGS. 5a through 5d are examples of displayed digits;

FIG. 10 is a graph showing the relationship between the resistance value of a thermistor and temperature;

FIG. 11 is a graph showing the relationship between the output voltage of the temperature detection circuit and the temperature;

FIG. 15 is a block diagram showing a sampling circuit;

FIG. 19A and FIG. 19B are block diagrams jointly showing the detail of the main control unit;

Figure 1:
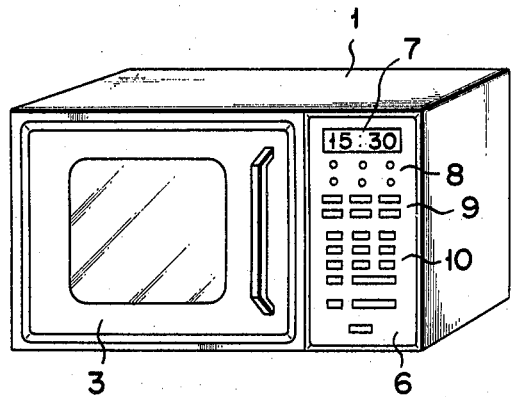
FIG. 1 is a perspective view of a microwave oven embodying the invention.
Figure 2:
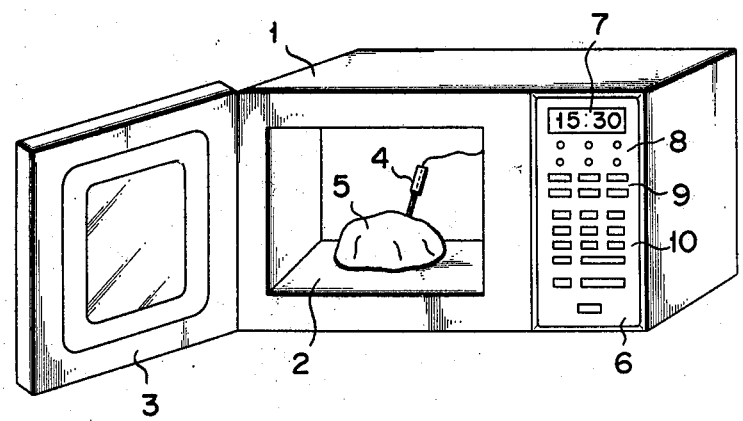
FIG. 2 is a perspective view of the oven with its door opened.

The microwave oven shown in FIGS. 1 and 2 includes a casing 1 containing a heating chamber 2. Microwave energy having a frequency of about 2450 MHz is supplied into the heating chamber 2 from a magnetron tube, not shown, and the front opening of the heating chamber 2 is closed by a door 3. A jack, not shown, is mounted on the inner wall of the heating chamber 2 and a temperature detection probe 4 is removably connected to the jack through a plug not shown. The purpose of the temperature detection probe 4 is to detect the temperature of the foodstuff 5 contained in the heating chamber 2 and the probe 4 contains a temperature sensing element such as a thermistor. A control panel 6 is mounted on the front wall of the casing 1 on the righthand side of the door 3.

Figure 3:
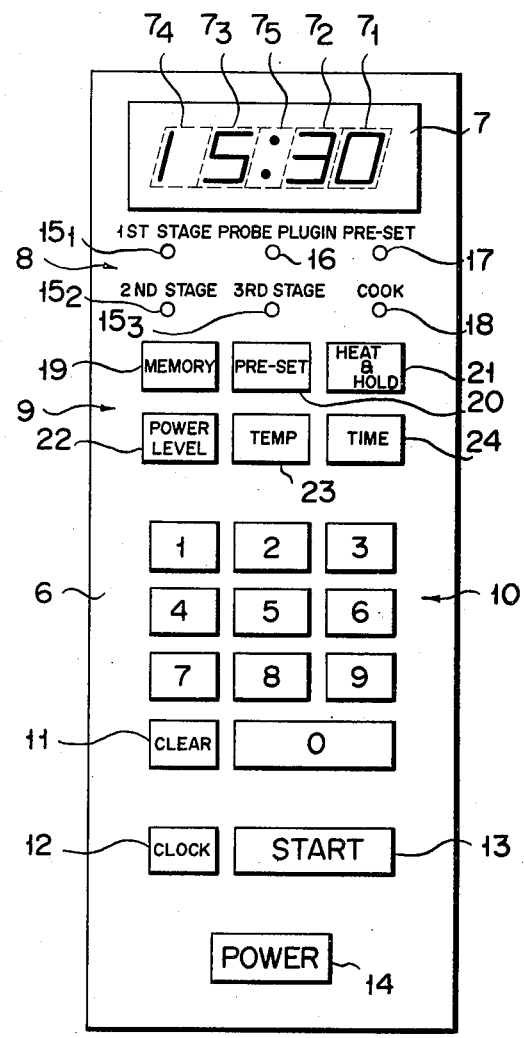
FIG. 3 is a plan view showing an arrangement of the component elements of an operating panel.

As shown in FIG. 3, the control panel 6 comprises a digital display unit 7, a function display unit 8, a function key unit 9 for setting the operating conditions, a 16-digit key unit 10, a clear key 11 for erasing the content set, a clock key for setting the time and display, a start key 13 for starting the heating and cooking operations. The display unit 7 digitally displays, minutes, hours, temperature and output level and comprises four display digits $7_1$ through $7_4$ and a color display member $7_5$ located between the second and third digits. Each one of the digits $7_1$ through $7_4$ comprises seven display segments a through g, for example luminous diodes, which are arranged in the form of a letter 8. Seconds are displayed by the first and second digits, and the minutes are displayed by the third and fourth digits as shown in FIG. 5a. At this time, the colon display member is continuously lighted. FIG. 5a shows "15 minutes 30 seconds". To display time intervals the minutes are displayed by the first and second digits, and the hours are displayed by the third and fourth digits while the colon display member is flickered at a period of one second. FIG. 5b shows a "10 hours 24 minutes". To display the temperature, as shown in FIG. 5c, unit C or F is displayed by the first digit, and the temperature is displayed by the second, third and fourth digits. In this case, the colon display member is not used. FIG. 5c shows a temperature of "90° C.". As shown in FIG. 5d, only the first and second digits are used to display the output level and the colon display member is not used. FIG. 5a shows a display of an output level of "99". In this example, the output level can be set in a range of from 0 to 99.

The function display unit 8 comprises first to third stage lamps $15_1$, $15_2$ and $15_3$ which indicate that whether it is possible or not to apply data to various stages described later (a preset function, a predetermined time heating function, temperature heating function, and temperature preserving function) and a specific stage under operation, a plug-in lamp 16 that indicates insertion of the plug of the temperature detection probe 4 into the jack, a preset lamp 17 that indicates the fact that a preset is possible and a cook lamp 18 showing that cooking is now being performed. These lamps $15_1$ through $15_3$ and 16, 17 and 18 may comprise luminous diodes, for example.

The function key unit 9 is constituted by a memory key 19 which is depressed at the time of storing set data, a preset key 20 depressed at the time of presetting, a temperature preserving key 21 depressed at the time of setting a temperature preserving condition, an output level key depressed at the time of setting an output level, a temperature key depressed at the time of setting the foodstuff temperature, and a time key 24 depressed at the time of setting a heating time.

Figure 6:
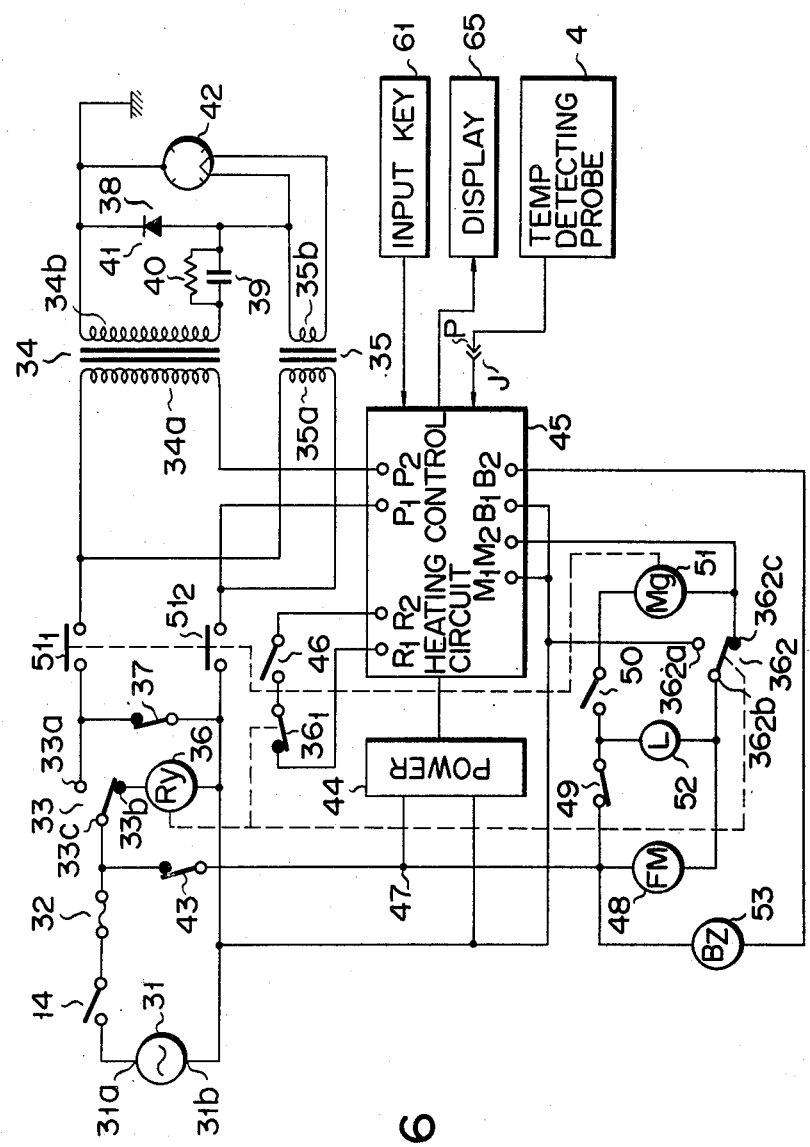
FIG. 6 is a connection diagram of the electric circuit.

FIG. 6 shows the entire electric circuit of the microwave oven of this invention, in which one terminal 31a of a commercial AC source 31 is connected to the movable contact $33_c$ of a door switch 33 via source switch 14 and a fuse 32 which are connected in series and the normally opened stationary contact 33a of the door switch 33 is connected to one end of the primary windings 34a and 35a respectively of a high voltage transformer 34 and a heater transformer 35 through the main contact $51_1$ of an electromagnetic contactor 51 to be described later. The door switch 33 is operated in response to the opening and closing of the door 3. Thus, when the door 3 is opened the movable contact 33c engages a stationary contact 33b whereas when the door is closed the movable contact engages the stationary contact 33a. The other terminal 31b of the source 31 is connected to the other end of the primary winding 35a of the heater transformer 35 and the terminal of a heating control circuit 45 to be described later through the other main contact $51_2$ of the electromagnetic contactor 51. A relay 36 is connected between the stationary contact 33b of the door switch 33 and the other terminal 31b of the source 31, while a normally closed short circuiting switch 37 is connected between the stationary contact 33a of the door switch 33 and the other terminal 31b of the source 31. The short circuiting switch 37 responds to the operation of the door 3 with a predetermined timing. Thus, when the door 3 is closed the short circuiting switch 37 is opened but when the door is opened the short circuiting switch is closed with a predetermined timing. A magnetron 42 is connected across the secondary winding 34b of the main transformer 34 through a rectifying circuit 41 including a rectifier 38, a capacitor 39 and a discharge resistor 40 and the cathode heater of the magnetron 42 is connected to the secondary winding 35b of the heater transformer 35. A source circuit 44 is connected between the juncture between the fuse 32 and the door switch 33 and the other terminal 31b of the source 31 via a thermal switch 43 which opens when the temperature of the heating chamber 2 exceeds a predetermined value. The source circuit 44 supplies power to the heating control circuit 45 and is constituted by a transformer and a rectifier circuit, not shown. Between the terminals $R_1$ and $R_2$ of the heating control circuit 45 are connected serially connected normally closed contact $36_1$ of the relay 36 and a normally open type lock switch 46. This lock switch is operated by a locking mechanism, not shown, interlocked with the handle of door 3 so as to be closed when the door is locked and opened when the door is unlocked. The terminal $P_2$ of the heating control circuit 45 is connected to the other terminal of the primary winding 34a of the high voltage transformer 34. The other terminal 31h of the source 31 is connected to the terminals $M_1$ and $M_2$ of the heating control circuit 45 and to a normally opened stationary contact $36_{2a}$ of the transfer switch $36_2$ of relay 36. The juncture 47 between the thermal switch 43 and the source circuit 44 is connected to one terminal of a fan motor 48 and to one end of the electromagnetic contactor 51 through a normally closed thermal switch 49 and a normally opened lock switch 50, while the other end of the electromagnetic contactor 13 is connected to the normally closed stationary contact $36_{2c}$ of the transfer switch $36_2$ and to terminal $M_2$ of the heating control circuit 45.

The other terminal of the fan motor 48 is connected to the movable contact $36_{2b}$ of the transfer switch $36_2$ and to one end of a cabinet lamp 52 having the other end connected to the juncture between the thermal switch 49 and the lock switch 50. The fan motor 48 is used to drive a fan, not shown, for cooling the magnetron 42 and exhausting the air in the heating chamber 2. The thermal switch 49 opens when the temperature of the magnetron exceeds a predetermined value, while the lock switch 50 operates in the same manner as the lock switch 46. The cabinet-lamp 52 is used to illuminate the interior of the heating chamber 2. The juncture 47 is connected to one terminal of a buzzer 53 having the other terminal connected to a terminal $B_2$ of the heating control circuit 45. The buzzer 53 operates when the heating or cooking is over.

Figure 7:
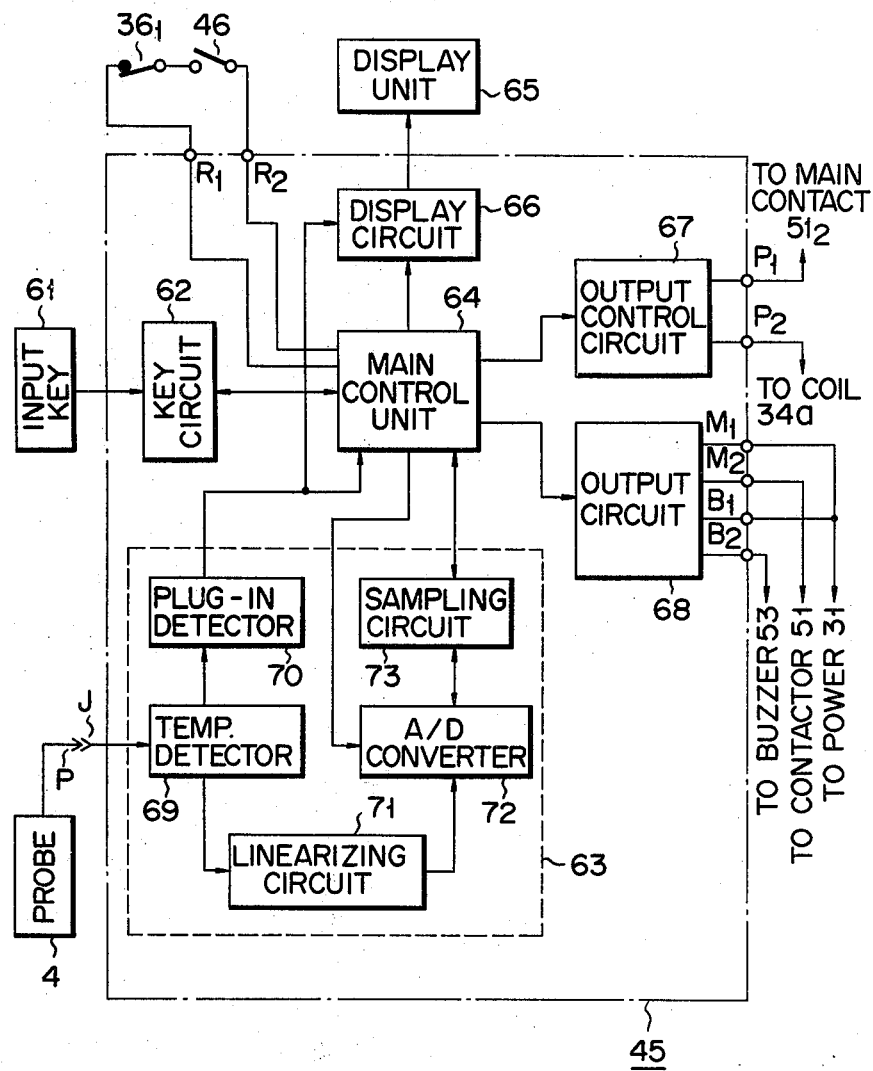
FIG. 7 is a diagram showing a heating control circuit.

FIG. 7 shows the detail of the heating control circuit 45 which comprises a key circuit 63 to which is connected an input key 61 of the function key unit 9, ten key unit 10, clear key 11, cooking key 12 and the start key 13; a temperature detector 63 for detecting the temperature of the foodstuff 5 in accordance with a signal generated by the temperature detection probe 4; a main control unit 64 connected to the key circuit 62, the temperature detector 63 and terminals $R_1$ and $R_2$; a display circuit 66 connected to the main control unit 64 for controlling a display unit 65 including the digital display unit 7 and the function display unit 8, and an output control circuit 67 connected to the main control unit 64 and the terminals $P_1$ and $P_2$; and an output circuit 68 connected to the main control unit 64 and the terminals $M_1$, $M_2$ and $B_1$. The temperature detector 63 comprises a temperature detection circuit 69 connected to the temperature detection probe 4 through a plug P and a jack J; a plug-in detection circuit 70 which detects the fact that the plug P of the temperature detection probe 4 has been inserted into the jack J in response to the signal from the temperature detection circuit 69 for sending a detection signal to the main control unit 64 and to the display circuit 66; a linearizing circuit 71 for linearizing the output signal of the temperature detection circuit 69, and A/D converter 72 responsive to the signal from the main control unit 64 for converting an analog output signal of the linearizing circuit 71 into a digital signal; and a sampling circuit 73 for sampling the output of the A/D converter 72 at each definite interval for sending the sampled output to the main control unit 64.

Figure 8:
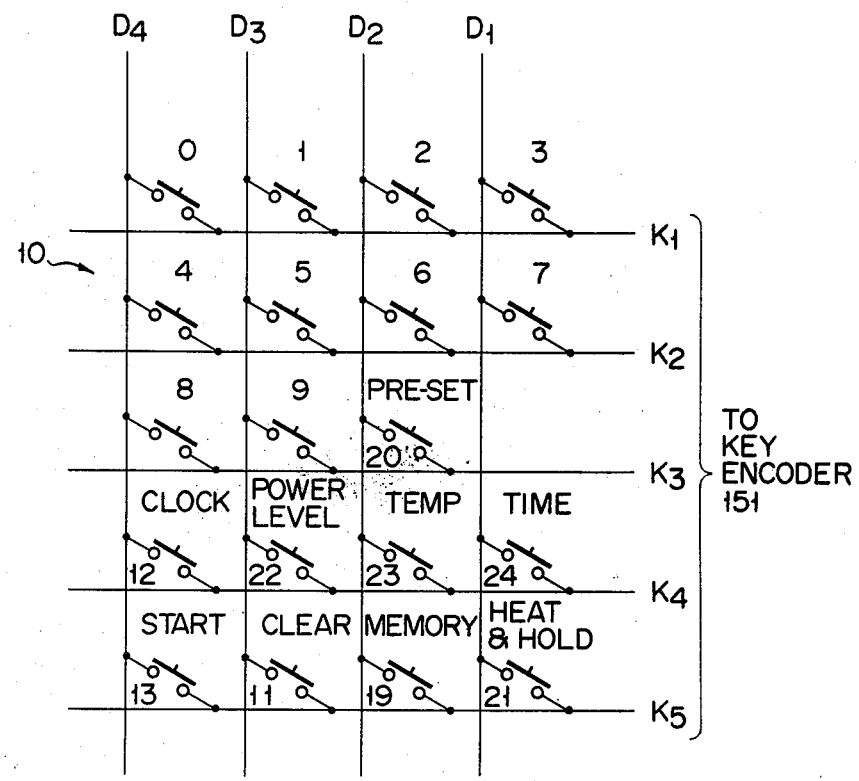
FIG. 8 is a diagram showing a key circuit.

As shown in FIG. 8, the key circuit 62 described is constituted by a well known matrix circuit formed by connecting the function key unit 9, the ten key unit 10, the clear key 11, the cooking key 12, and the start key 13 in the form of a matrix. When a key 11 is depressed, a signal designated by digit signals $D_1$ through $D_4$ supplied from the main control unit 64 is supplied to each of the key lines $K_1$ through $K_5$ which are connected to an encoder 151 of the main control unit 64 as will be described later.

Figure 9:
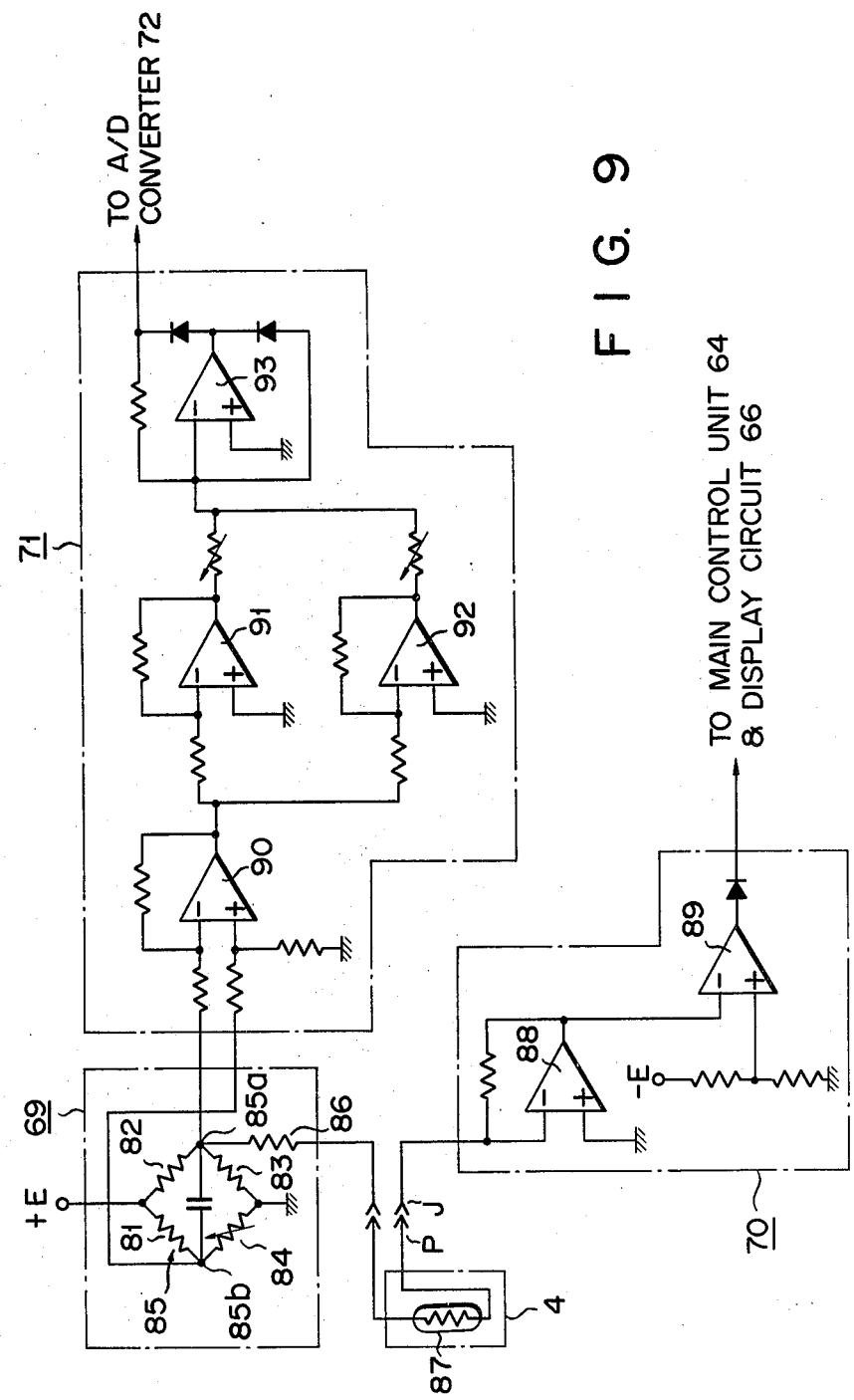
FIG. 9 is a connection diagram showing a temperature detection circuit, a plug-in detection circuit and a linearizing circuit.

FIG. 9 shows the temperature detection circuit 69, the plug-in detection circuit 70 and the linearizing circuit 71 which are constructed as follows. Thus, the temperature detection circuit 69 of FIG. 9 comprises a bridge circuit 85 constituted by resistors 81, 82, 83 and a zero point adjusting variable resistor 84; and a temperature sensitive element, for example, a thermistor 87 contained in the temperature detection probe 4 and having one terminal connected to one output terminal of the bridge circuit 85 through a resistor 86 and the jack J and the plug P. The other terminal of the thermistor 87 is connected to one input of an operational amplifier 88 of the plug-in detection circuit 70 through the plug P and the jack J. Thus, the other terminal of the thermistor 87 is grounded through the operational amplifier 88 so that as the resistance of the thermistor 87 varies in response to the temperature variation, the output voltage of the bridge circuit 85 varies accordingly.

The plug-in detection circuit 70 comprises said operational amplifier 88, and a second operational amplifier 89 having one input connected to receive the output of the operational amplifier 88. Accordingly, when the plug P of the temperature detection probe 4 is inserted into the jack J to connect the thermistor 87, the input level of the operational amplifier 88 changes to cause it ON, with a consequence, the operational amplifier becomes OFF and does not produce any output voltage. Under these conditions, when the thermistor 87 breaks or the plug P of the probe is removed from the jack, the thermistor will be disconnected from the circuit thereby changing the input level of the operational amplifier 88 thus rendering OFF the same and ON the operational amplifier 89. Thus, a voltage having a predetermined level is produced.

Figure 12:
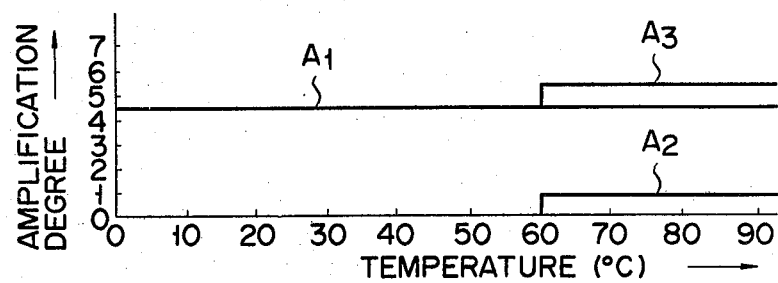
FIG. 12 is a graph showing the relationship between the temperature and the degree of amplification of the linearlizing circuit.
Figure 13:
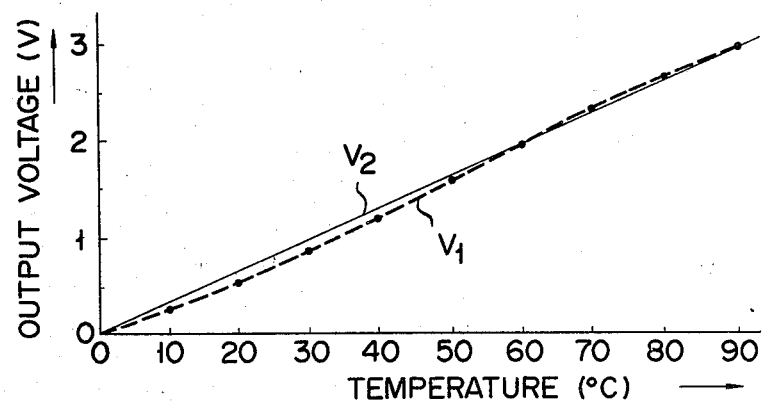
FIG. 13 is a graph showing the relationship between the output voltage of the linearizing circuit and the temperature.

As shown in FIG. 10 the resistance value of the thermistor 87 varies nonlinearly with reference to temperature so that the output voltage of the temperature detection circuit 69 also varies nonlinearly. The linearizing circuit 71 is provided for correcting this and comprises an operational amplifier 90 for amplifying the voltage appearing across the output terminals $85a$ and $85b$ of the bridge circuit 85, operational amplifiers 91 and 92 for amplifying the output of the operational amplifier 90, and an operational amplifier 93 for synthesizing and amplifying the outputs of the operational amplifiers 91 and 92. The relationship between the degree of amplification of the operational amplifiers 90 through 93 and the temperature is set to that shown in FIG. 12 so as to amplify by the operational amplifiers 90 to 93 up to a predetermined level and thereafter by operational amplifiers 90, 91, 92 and 93. In FIG. 12, $A_1$ shows the degree of amplification provided by amplifiers 90, 91 and 93, $A_2$ that provided by amplifiers 92 and 93 and $A_3$ the overall degree of amplification ($A_1 + A_2$). Consequently, the voltage produced by the linearizing circuit 71 varies linearly with temperature as shown by a dotted line $V_1$ shown in FIG. 13 in which solid line $V_2$ shows an ideal relationship between the temperature and the output voltage.

Figure 14:
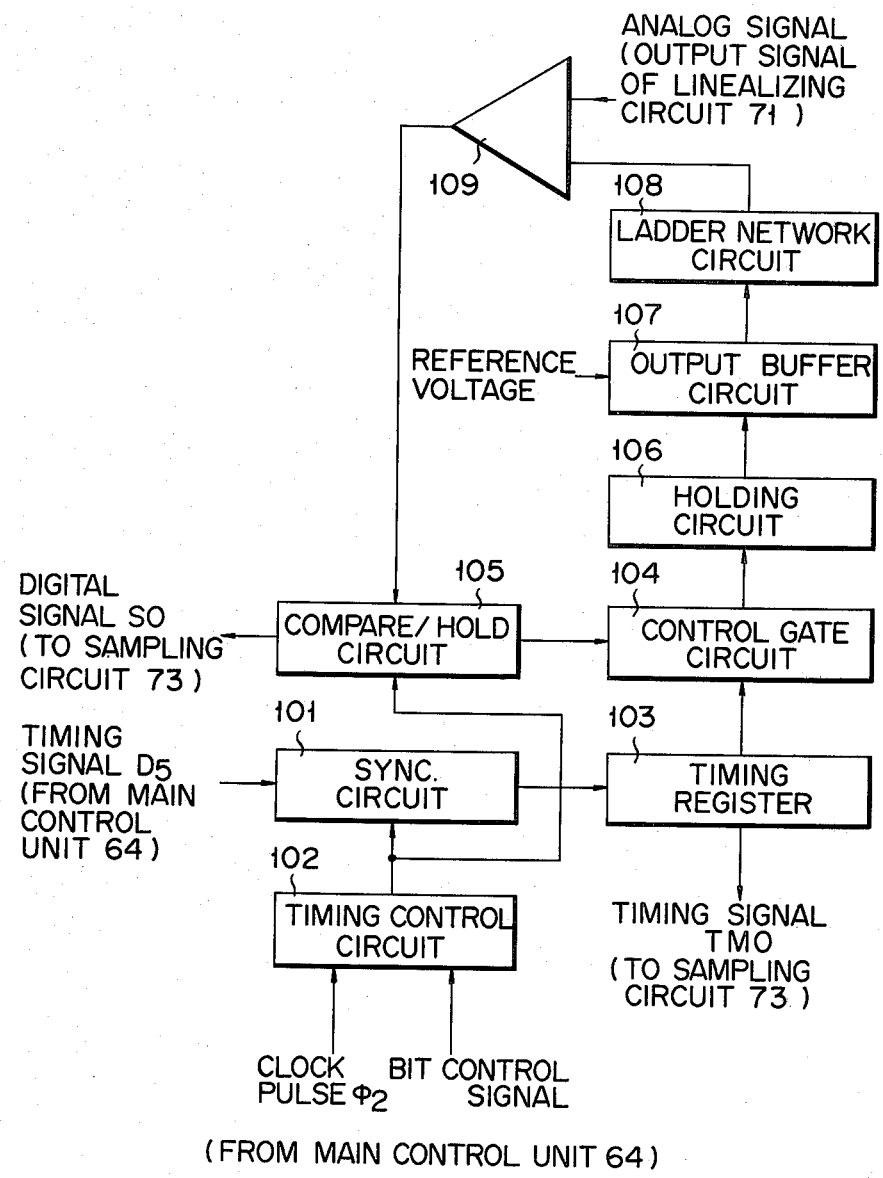
FIG. 14 is a block diagram showing an A/D converting circuit.

As shown in FIG. 14, the A/D converter 72 comprises a synchronizing circuit 101 which sends a digital signal $D_5$ sent from the main control unit 64 to a timing register 103 in accordance with a signal supplied by a timing control circuit 102 which is supplied with a clock pulse $\phi_2$ from the main control unit 64, and a bit control signal. In response to the synchronizing signal from the synchronizing circuit 101, the timing register 103 sends a gate control signal to a gate control circuit 104 and a timing signal TMO to the sampling circuit 73. In response to the gate control signal from the timing register 103, the control gate circuit 104 sends the content of a comparison and holding circuit 105 to a holding circuit. The content held in the holding circuit 106 is sent to a ladder network circuit 108 through an output buffer circuit 107. In response to the input data from the output buffer circuit 107, the ladder network circuit 108 firstly produces an output signal having a voltage one half of the reference voltage V and then produces voltages which sequentially varies by $\frac{1}{4}$ V, $\frac{1}{8}$ V ... 1/128 V with a predetermined timing and the output signal is applied to one input terminal of a comparator 109. To the other input of this comparator is applied the output signal of the linearizing circuit 71, that is an analog signal (temperature detection signal). The comparator 109 compares this analog signal with the output signal produced by the ladder network circuit 108 to produce an output "1" when the former is larger than the latter. The output of the comparator 109 is sent to the comparator and holder circuit 105 to be held therein, and the content thereof is sent to the sampling circuit 73 as a digital signal SO (temperature data). The output level of the ladder network circuit 108 varies in accordance with the result of comparison of the comparator 109 which is held in the comparison and hold circuit 105 and the output level is compared as follows.

Figure 16:
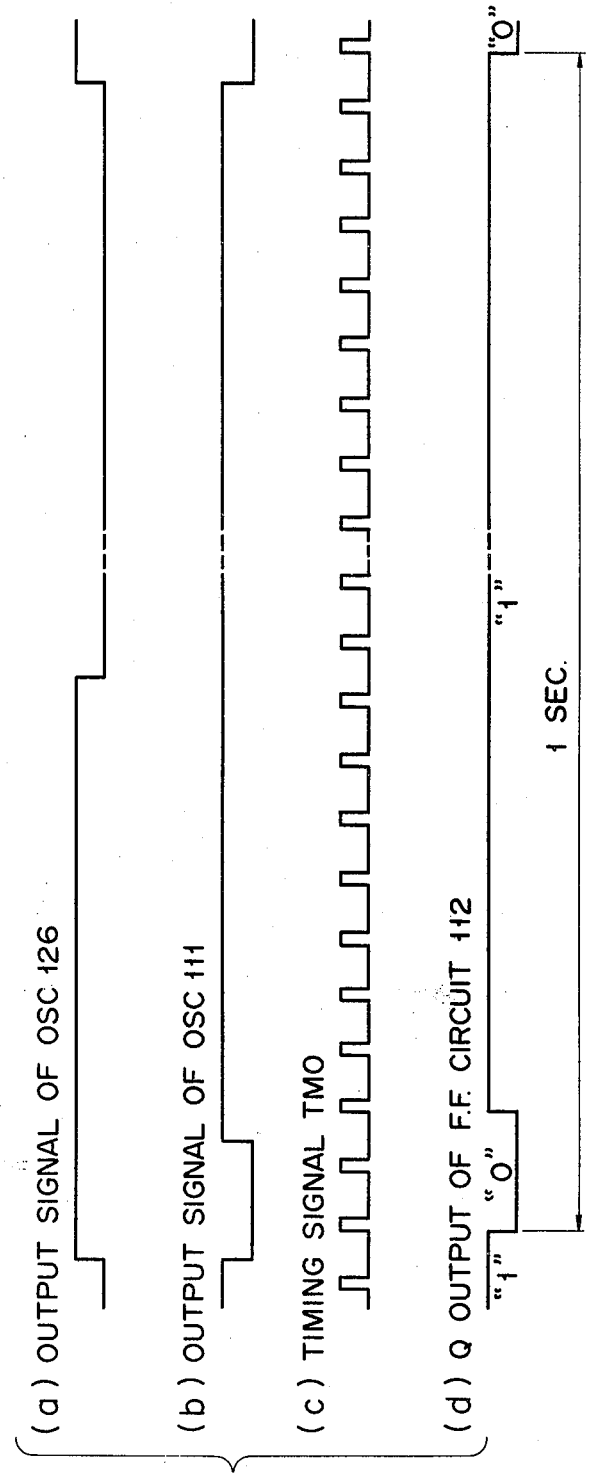
FIGS. 16a through 16d and FIGS. 17a through 17f show timing charts of the sampling circuit.

As shown in FIG. 15, the sampling circuit 73 is constructed to sample, at each definite period, the output of the A/D converter 72, that is the digital signal SO in accordance with an instruction sent from the main control unit 64 to supply the sampled signal to the main control unit 64 thereby detecting the temperature at a cycle of 0.5 to 2 seconds so as to render the displayed temperature (to be described later) to be readily visibly by preventing flicker. The sampling circuit 73 comprises a CR oscillation circuit 111, a D type flip-flop circuit 112, a 10-bit shift register 113, NAND gate circuits 114, 115 and 116, and an inverter 117. The CR oscillation circuit 111 comprises a CR oscillator 126 including inverters 118, 119 and 120, a variable capacitor 121, a resistor 122, a variable resistor 123 and diodes, 124 and 125 which are connected as shown, and a differentiation circuit 132 including a capacitor 127, resistors 128 and 129, a diode 130 and an inverter 131 and adapted to differentiate the output signal of the oscillator 126, and the oscillation frequency of the oscillator 126 is determined by varying the CR time constant of capacitor 121 and resistor 123, for example. The operation of the oscillating circuit 111 will be described in detail by the aid of the timing charts shown in FIGS. 16a through 16d and FIGS. 17a through 17f. The oscillator 126 produces a signal having a constant period as shown in FIG. 16a, which is converted into a pulse signal of a constant width shown in FIG. 16₁ by the differentiation circuit 132, thus producing the output signal of the oscillation circuit 111. This output signal is supplied to the flip-flop circuit 112 together with the timing signal TMO produced by the A/D converter 72. Thus, the flip-flop circuit 112 is set and reset by the output signal of the oscillation circuit 111 in synchronism with the timing signal TMO.

Figure 17:
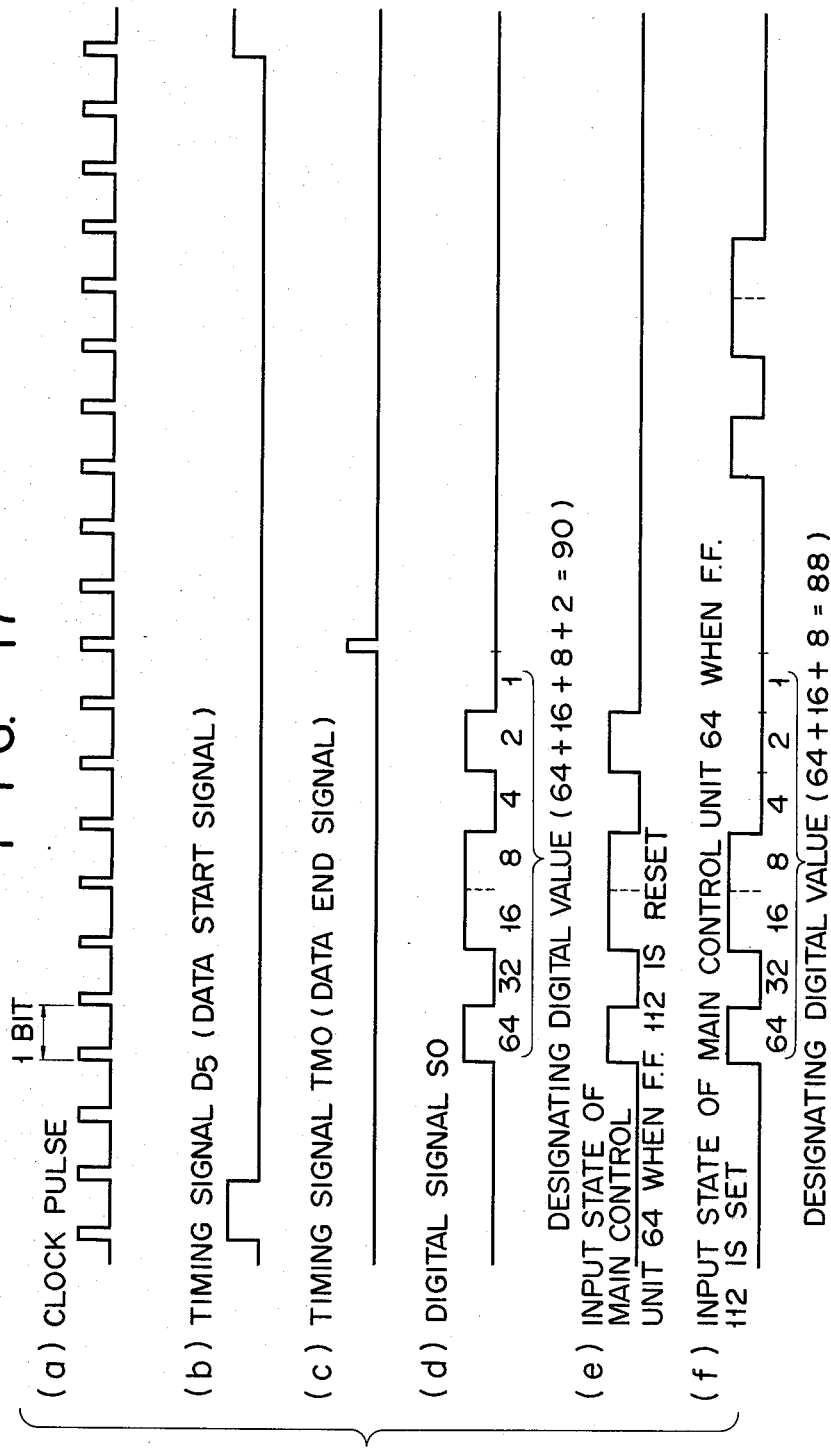

When a digital signal D5 (acting as the data initiation signal) is supplied to the A.D. converter 72 from the main control unit 64, the A/D converter 72 converts this signal into a digit signal for producing a digital signal SO as shown in FIG. 17d which is supplied to the NAND gate circuit 114. When the flip-flop circuit 112 is in its reset stage at this time, its Q output is at the "0" level so that the NAND gate circuit 116 is disenabled whereas the NAND gate circuits 114 and 115 are enabled to supply the digital signal SO to the main control unit 64 as shown in FIG. 17a. The digital signal is also stored in the shift register 113 by the clock pulse supplied from the main control unit 64. When the conversion of the temperature detection signal by the A/D converter 72 is completed, the A/D converter 72 produces a timing signal (data termination signal) TMO which is applied to the flip-flop circuit 112. Consequently, the flip-flop circuit 112 is set by the output of the oscillation circuit 111 in synchronism with the timing signal TMO and its Q output becomes "1" level. As a consequence, the NAND gate circuit 114 is disenabled whereas the NAND gate circuits 115 and 116 are enabled. Consequently, the digital signal SO stored in the shift register 113 is caused to circulate through the register 113 via the NAND gate circuits 116 and 115 by the clock pulse $\phi_2$ and the circulating digital signal SO is sequentially sent to the main control unit 64 as shown by FIG. 17f. At this time, since the NAND gate circuit 114 is enabled the next digital signal SO produced by the A/D converter 72 would be ignored. Thereafter, when the flip-flop circuit 112 is reset, the original status is resumed to effect the sampling operation of the next digital signal SO produced by the A/D converter 72. Thereafter, the operation described above is repeated.

Figure 18:
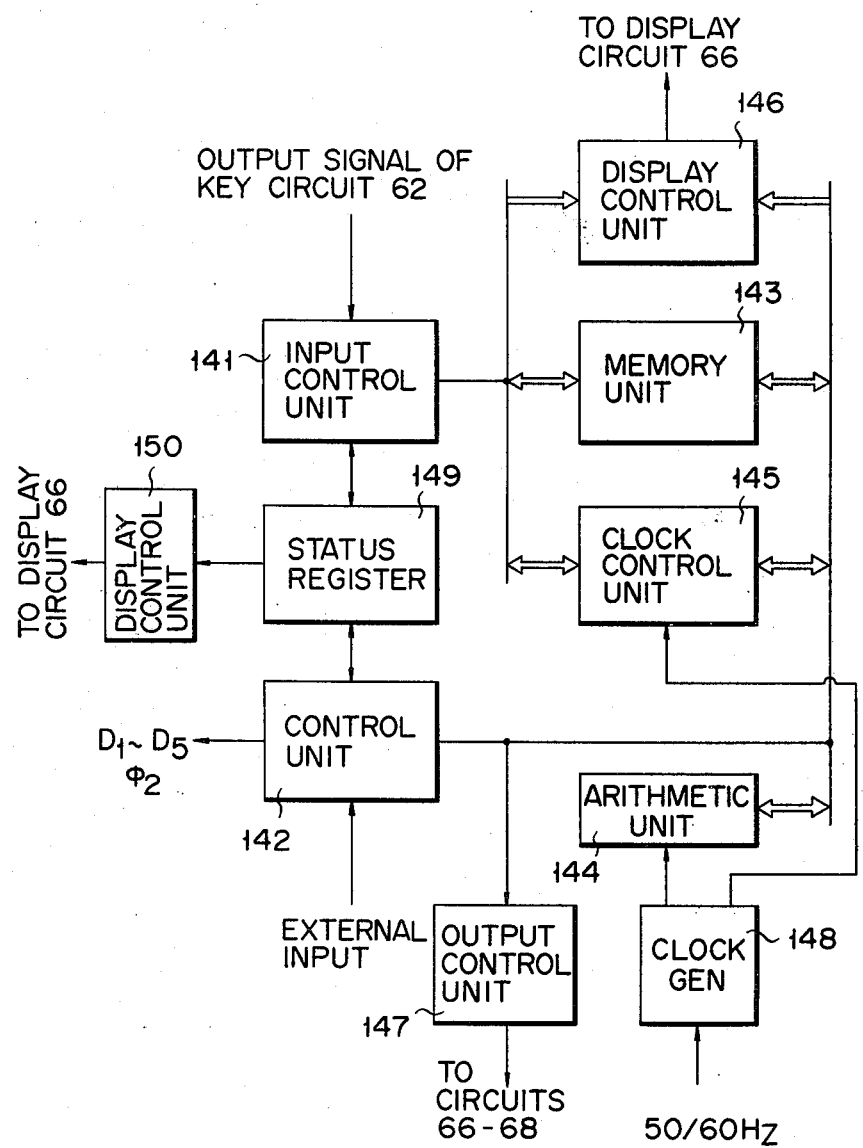
FIG. 18 is a diagrammatic block diagram showing the main control circuit.

As shown in FIGS. 18 and 19, the main control unit 64 comprises an input control unit 141, a control unit 142, a memory unit 143, an arithmetic operation unit 144, a clock control unit, a first display unit 146, an output control unit 147, a clock generating unit 148, a status register 149 and the display unit 150 shown in Table 2. The detail of these component units will be described as follows. The input control unit 141 is made up of a key encoder 151 and a key ROM (read only memory device) incorporated with a prescribed microprogram and functions as follows. More particularly, the depressed key is identified and detected by a key signal produced by the key circuit 62 to store data in the memory section 143, transfer the display to the first data control unit 146 and transfer the data to the control section 145. The data is read out from the memory unit 143 by the operation of the function key unit 9 to supply the data to the first display control unit 146. By this function, it is possible to fetch the content previously set for displaying and confirming the same.

Figure 20:
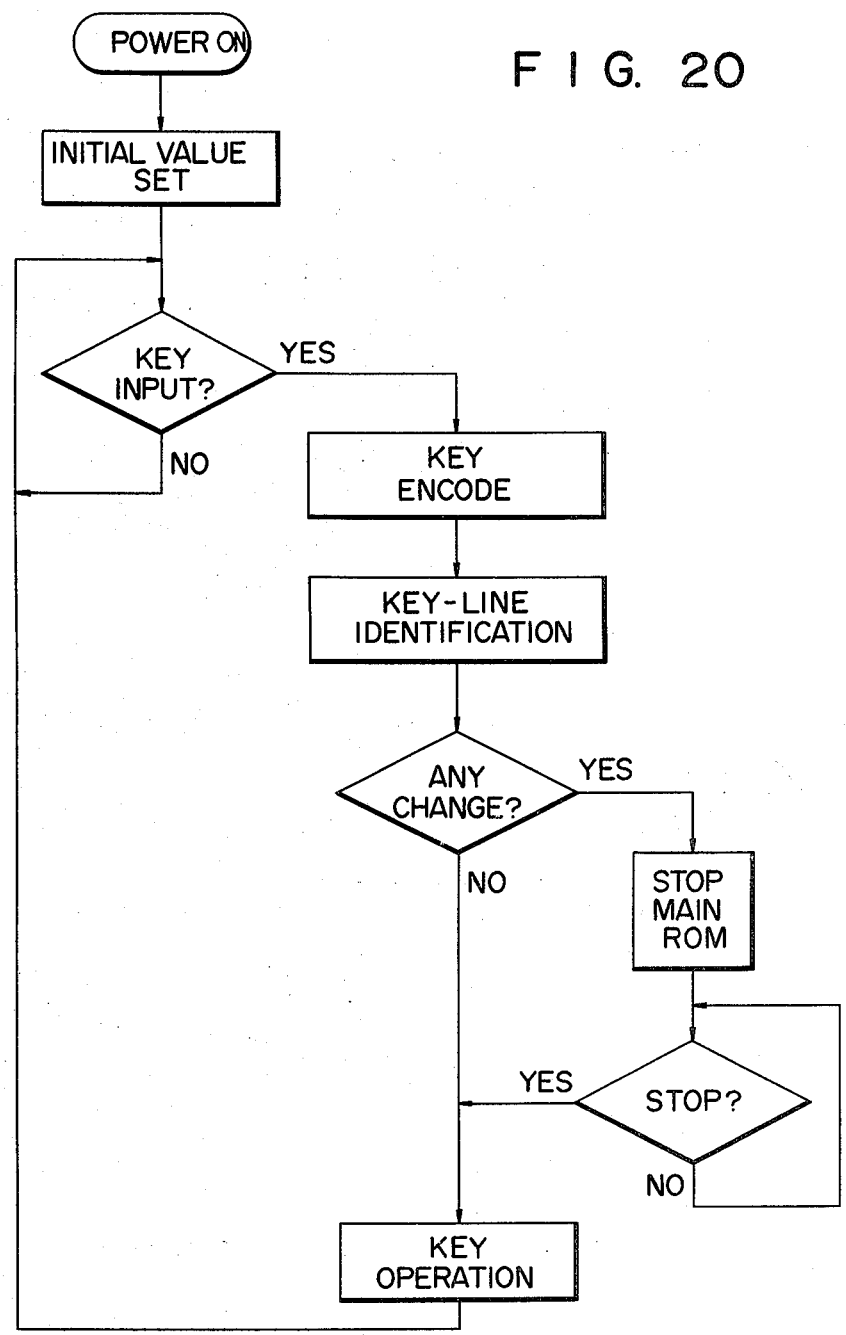
FIG. 20 is a flow chart for explaining the operation of a key read only memory device (ROM)
Figure 21:
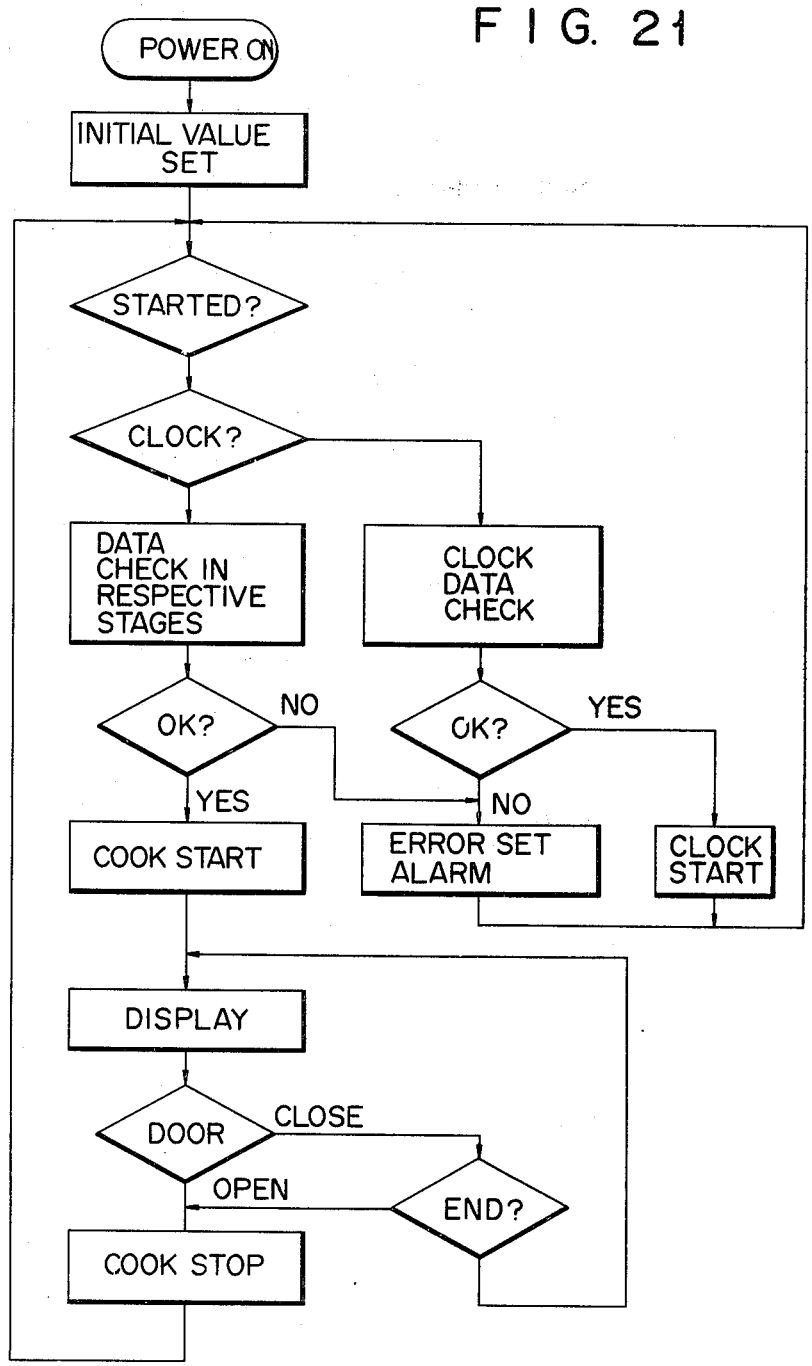
FIG. 21 is a flow chart for explaining the operation of a main ROM.
Figure 22:
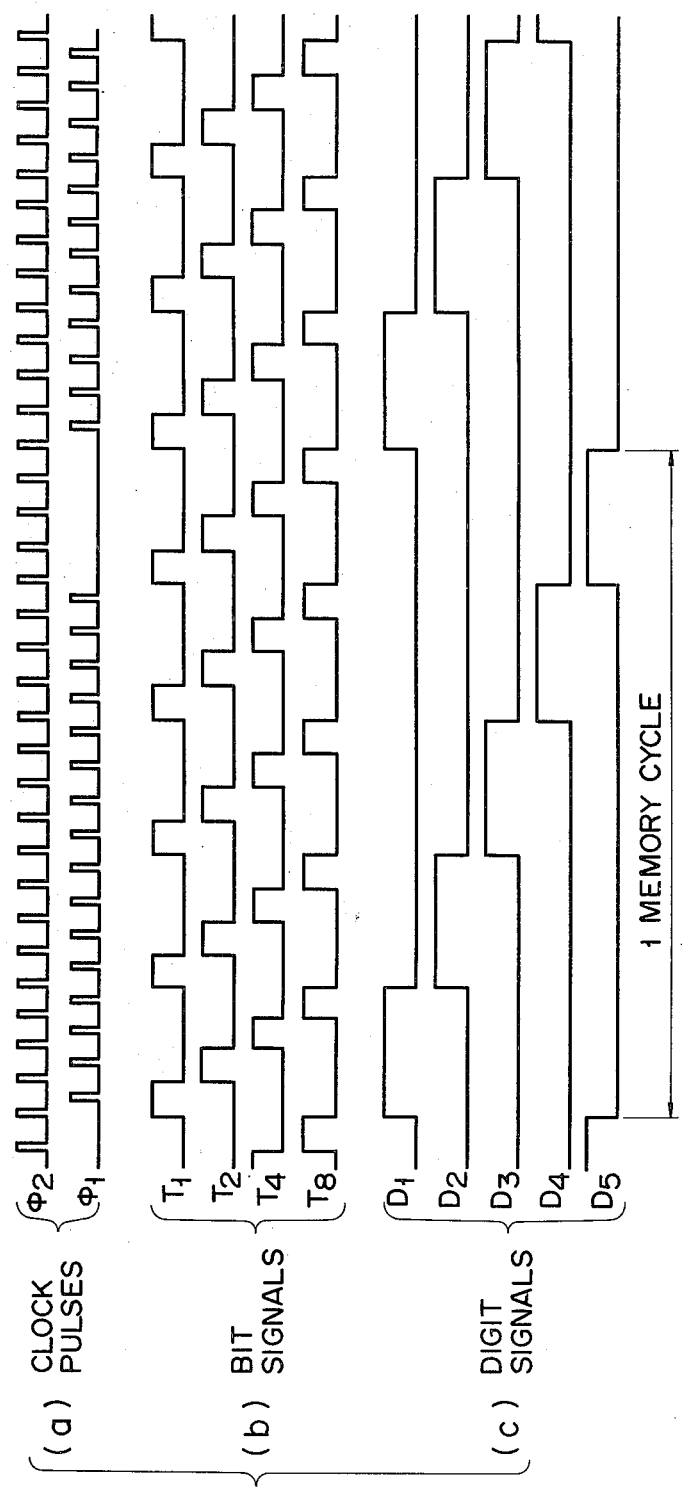
FIG. 22 shows a timing chart of a timing signal generator.

The control unit 142 comprises a main ROM 153 incorporated with a predetermined microprogram and a timing signal generator 155 which generates such timing signals for controlling various units such as clock pulses $\phi_1$, $\phi_2$, bit signals $T_1$, $T_2$, $T_4$, $T_8$ and digit signals $D_1$ through $D_5$ shown in FIGS. 22a through 22c, in response to the pulse produced by a pulse generator 154, and provides the following functions. More particularly, its operation is started by the operations of the start key 13 and the clock key 12. When the clock key 12 is depressed clock control is commenced. At this stage, a commercial frequency of 50 or 60 Hz is counted up to the digit of minutes to have a carry therefrom. This carry data corresponding to a minute unit is added to an input numerical value of minute unit. When the start key 13 is depressed the input data to the memory unit 143 is fetched to the arithmetic operation unit 144. The contents of the data at respective stages (first to third preset data) are checked and these contents are encoded and stored in a status register 149. When the operation is actually started, the first stage (preset function), the second stage (heating function), the third stage (temperature preserving stage) are sequentially controlled in accordance with the content of the status register 149. Furthermore, various controls are also performed in response to such external inputs as the signal from the temperature detector 63, signals from terminals $R_1$ and $R_2$, the temperature display unit transfer signal (F or C), the output level variable range transfer signal, maximum set time transfer signal of the heating time and the source frequency transfer signal. The operation charts of the key ROM and the main ROM are shown by FIGS. 20 and 21 respectively.

The memory unit 143 is made up of a control gate circuit 156 and a register group 157. The register group 157 comprises time data storing registers $RS_1$ through $RS_3$ of the first to third stages, temperature data storing registers $RS_4$ through $RS_6$ of the first to third stages, output level data storing registers $RS_7$ through $RS_9$ of the first to third stages, a preset time data storing register $RS_{10}$ and a register $RS_{11}$ for storing other data, and the memory unit 143 provides the following functions. Thus, the memory unit 143 functions to hold (store) the data from the input control unit 141 and the control unit 142 for respective stages and controls these control units 141 and 142. The contents of the data to be stored involve not only the interval, temperature, output level and time, but also involve a portion of the data encoded by the control unit 142. The arithmetic operation unit 144 comprises a control gate circuit 158, an additional subtractor 159 and an operation register 160 and provides the following functions. Thus, it performs decimal addition and subtraction operations as well as 60 digits subtraction (for hours) and various data checks. The clock control unit 145 is constructed such that its clock pulse input data is checked by the control unit 142 and the arithmetic operation unit 144. When the data is judged to be normal by the control unit 142, the clock control unit 145 commences its operation. Then, the clock control unit is disconnected from the control unit 142 and the arithmetic operation unit 144 until a clock termination instruction is received from the input control unit 141 whereby the clock control unit continues to operate independently.

The first display control unit 146 is constituted by a control gate circuit 161, a half-adder 162 provided with a shift register, a display register 163, a latch circuit 164 and a segment decoder 165 provided with a buffer circuit, and provides the following functions. More particularly, it receives the data transferred from the input control unit 141 and the control unit 142, for supplying segment signals A through G to a display circuit 66. The output control unit 147 is controlled by the control unit 142 for supplying a cook display signal to the display circuit 66, an out control signal to the display circuit 66, an output control signal to the output control circuit 67, and an electromagnetic contactor drive signal and a buzzer drive signal to the output circuit 68, thus controlling the electromagnetic contactor 51, buzzer 53 and the output control circuit 67. The clock generator 148 comprises a synchronizing circuit 166 for maintaining synchronism with the control unit 142, and a clock generating register 167 equipped with an adder and provides the following functions. Thus, it produces reference time pulses (100 ms, 1 sec, 1 min) by using a commercial frequency of 50 or 60 Hz for supplying these pulses to the clock control unit 145 and the arithmetic operation unit. The status register 149 acts as an interface between the input control unit 141 and the control unit 142 so that these control units can know the job performed by the other elements. In response to the content of the status register 149, the second display unit 150 supplies a lamp display signal and a colon display signal to the display circuit 66.

Figure 23:
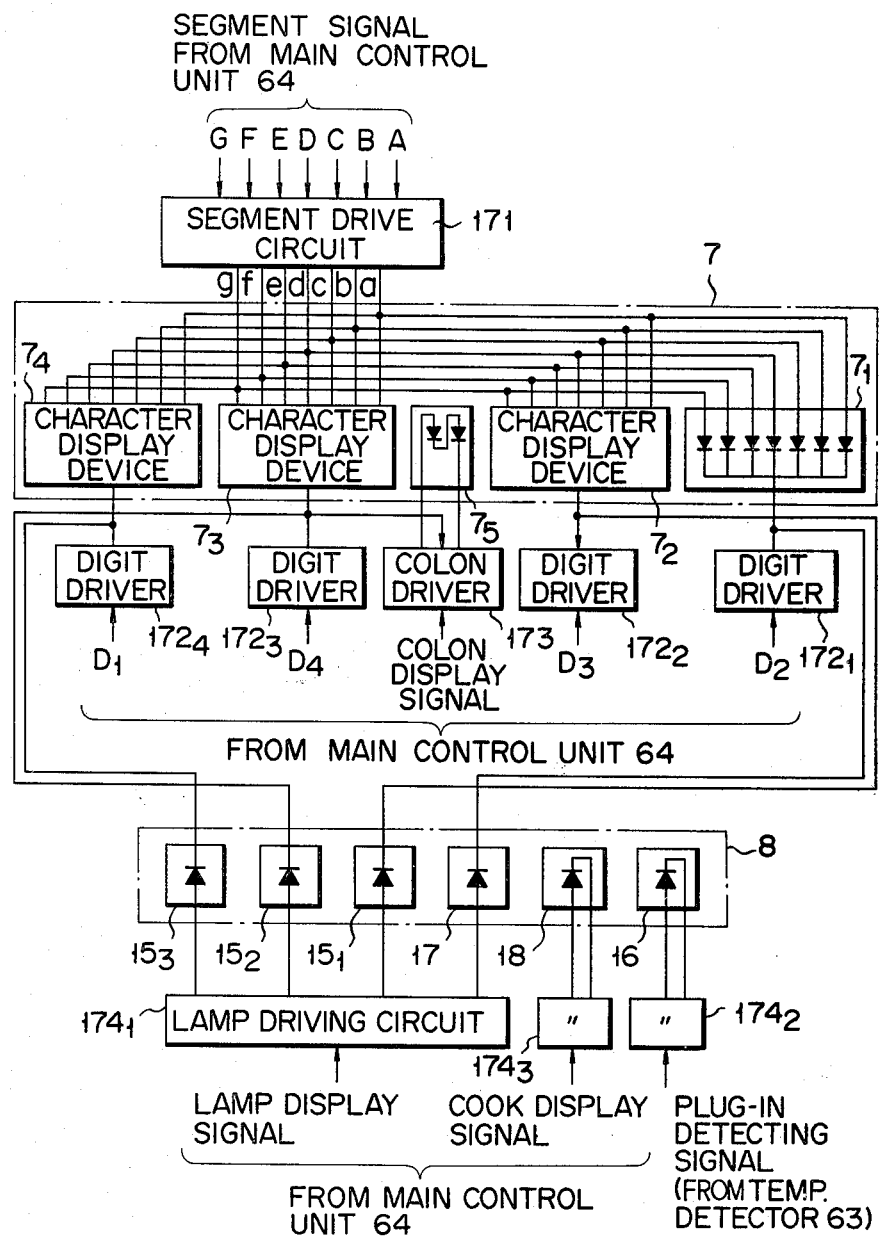
FIG. 23 is a block diagram showing a display circuit.

As shown by FIG. 23, the display circuit 66 comprises a segment drive circuit 171, a digit drive circuits $172_1$, $172_2$ $172_3$ and $172_4$, a colon drive circuit 173 and lamp drive circuits $174_1$, $174_2$ and $174_3$. The segment drive circuit 171 drives the segments a through g of respective digit display devices $7_1$ through $7_4$ of the digital display unit 7 in response to the segment signals A through G produced by the first display control unit 146 of the main control unit 64. The digit drive circuits $172_1$ through $172_4$ selectively drive the digits of the display unit 7 in response to the digit signals $D_1$ through $D_4$ sent from the main control unit 64. The colon drive circuit 173 drives the colon display member $7_5$ of the digital display unit 7 in synchronism with the output (digit signal $D_4$) of the digit drive circuit $172_3$ in response to the colon display signal produced by the main control unit 64. In response to the lamp display signal sent from the main control unit 64, the lamp drive circuit $174_1$ drives lamps $15_1$ through $15_3$ and 17 of the function display unit 8 in synchronism with the outputs (digit signals $D_1$ through $D_4$) of respective digit drive circuits $172_1$ through $172_4$, and the lamp drive circuits $174_2$ and $174_3$ drive lamps 16 and 18 respectively of the function display unit 8 in response to the cook display signal sent from the main control unit 64 and the plug-in detection signal sent from the temperature detection unit 63.

Figure 24:
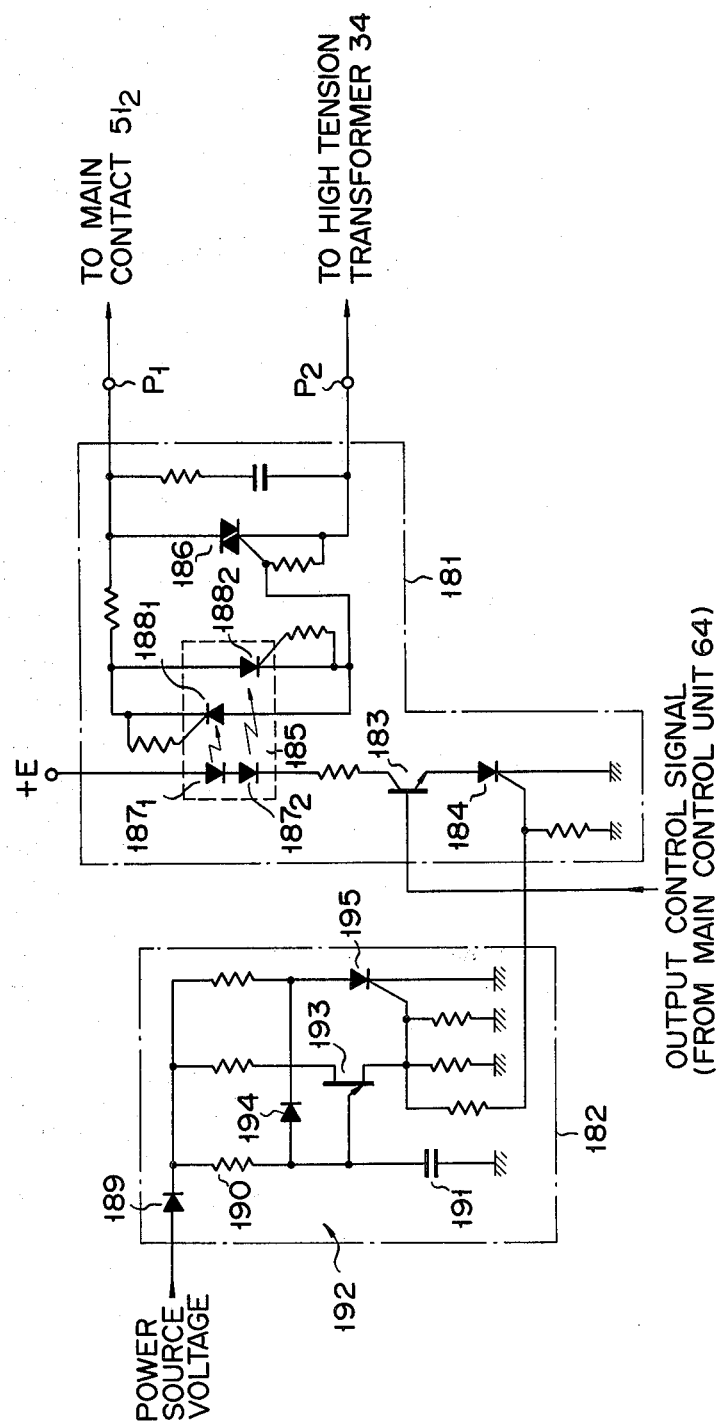
FIG. 24 is a connection diagram of an output control circuit.

As shown in FIG. 24, the output control circuit 67 comprises a switching circuit 181 and a timing circuit 182. The switching circuit 181 ON-OFF controls the primary winding of the high voltage transformer 34 in synchronism with the output (timing pulse) of the timing circuit 182 in response to the output control signal produced by the output control unit 147 of the main control unit 64 and comprises a transistor 183 ON-OFF controlled by the output signal of the timing circuit 182 and the output control signal, a thyristor 184, a photocoupler 185 ON-OFF controlled by the ON-OFF operation of the transistor 183, and a triac 186 connected between terminals $P_1$ and $P_2$ to be ON-OFF controlled by the ON-OFF operation of the photocoupler 185. The photocoupler 85 comprises a pair of luminous diodes $187_1$ and $187_2$ serially connected with transistor 183 and a pair of parallel connected photo-exited thyristors $188_1$ and $188_2$ which supply a gate singal to the triac 186 in response to the light emitted by the luminous diodes $187_1$ and $187_2$. The timing circuit 182 takes the form of an oscillation circuit utilized to prevent the input surge current to the high voltage transformer 34 by synchronizing the ON-OFF operation of the switching circuit 181 with the source voltage waveform. The timing circuit 182 comprises a half wave rectifier 189 connected to the source 31, a time constant circuit 192 including a resistor 190 and a capacitor 191 and energized by the rectified voltage, a unijunction transistor 193 connected to respond to the output of the time constant circuit and a thyristor 195 ON-OFF controlled by the operation of the unijunction transistor 193 for discharging the charge of capacitor 191 through a diode 194.

Figure 25:
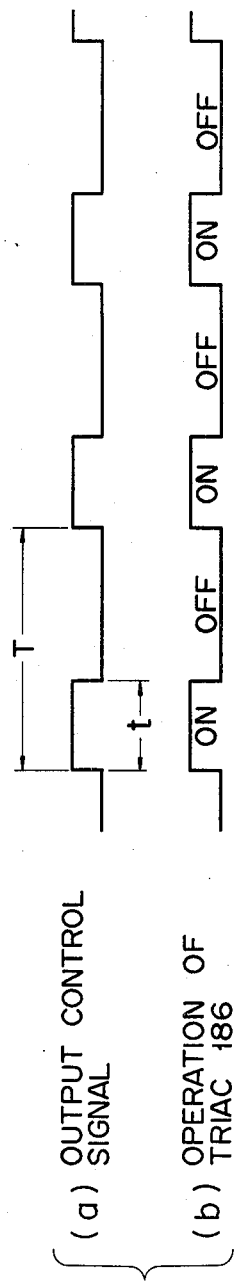
FIGS. 25a and 25b and FIGS. 26a through 26h show waveforms at various portions of the output control circuit.
Figure 26:
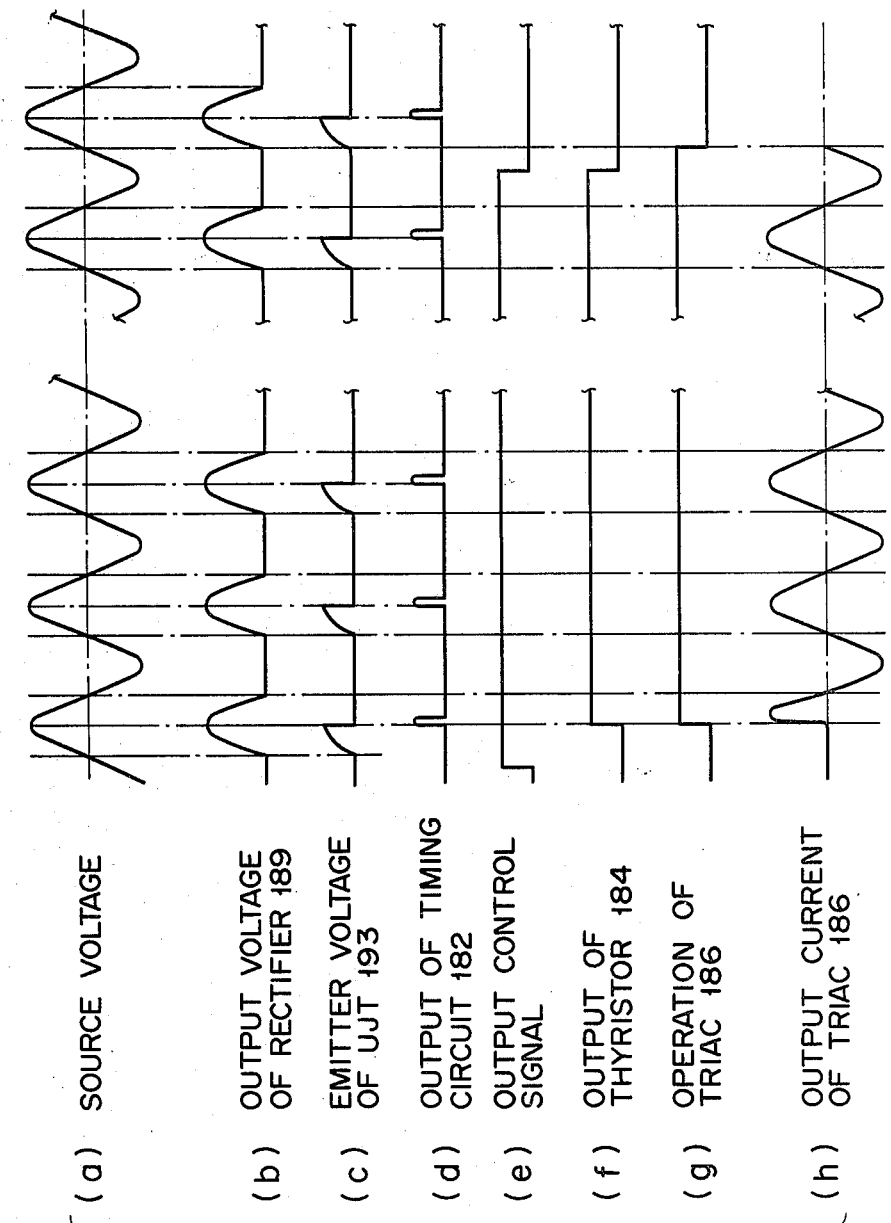

The output control signal is produced by the output control unit 147 of the main control unit 64 and takes the form of a pulse having a constant period T as shown in FIG. 25a the pulse width t thereof being variable in 99 steps, for example, in accordance with the output level set by the output control unit 147. Consequently, when the output control signal is supplied to the switching circuit 181 and when the output signal (timing pulse) of the timing circuit 182 is supplied, transistor 183 and thyristor 184 turn ON and OFF in response to these control signals. Accordingly, in response to their output signals the triac 186 becomes ON and OFF as shown in FIG. 25b thus controlling the supply of power to the high voltage transformer 34.

On the other hand, the timing circuit 182 oscillates in synchronism with the source voltage waveform as shown by the timing charts shown in FIG. 26a through FIG. 26d thereby producing a timing pulse near the maximum value of each half cycle of the source voltage. Accordingly, the thyristor 184 becomes ON and OFF as shown in FIG. 26f in response to the timing pulse and the output control signal whereby the triac 186 becomes ON and OFF in response to the ON-OFF operation of the thyristor 184 as shown in FIG. 26g. Thus, the triac 186 becomes ON near the maximum value of the source voltage and OFF near the zero point thereof, thereby producing a current waveform $a_1$ shown in FIG. 26h.

Figure 27:
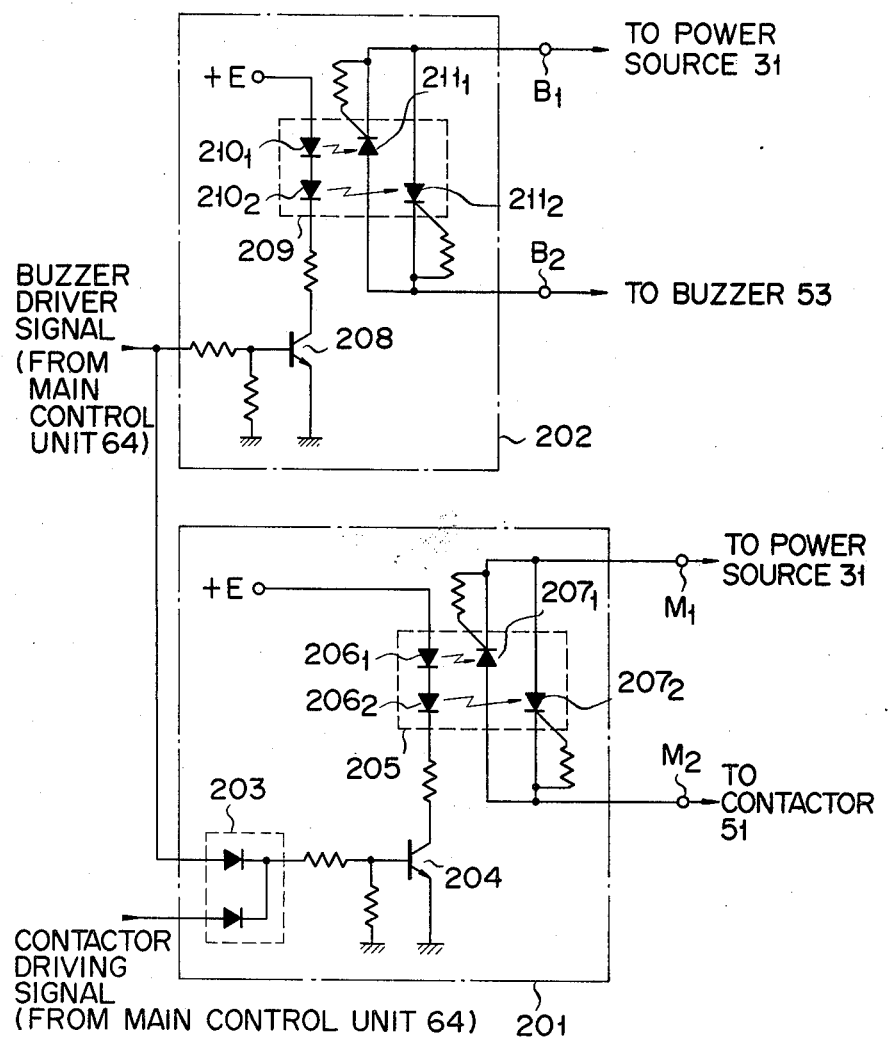
FIG. 27 is a connection diagram showing the output circuit.

As shown in FIG. 27, the output circuit 68 comprises an electromagnetic contactor drive circuit 201 and a buzzer drive circuit 202. The electromagnetic contactor drive circuit 201 drives the electromagnetic contactor 51 in response to the electromagnetic contactor drive signal and the buzzer drive signal produced by the output control unit 147 of the main control unit 64 and comprises an OR gate circuit 203 supplied with these drive signals, a transistor 204 ON-OFF controlled by the output of the OR gate circuit 203, and photocoupler 205 ON-OFF controlled by the output of transistor 204. The photocoupler 205 is constituted by a pair of luminous diodes $206_1$ and $206_2$ serially connected with the transistor 204 and a pair of photoexcited thyristors $207_1$ and $207_2$ connected in parallel across the terminals $M_1$ and $M_2$ and arranged to be excited by the light emitted by the luminous diodes $206_1$ and $206_2$ respectively. The buzzer drive circuit 202 is used to drive the buzzer 53 in response to the buzzer drive signal produced by the output control unit 147 of the main controller 64 and comprises a transistor 208 ON-OFF controlled by the buzzer drive signal, and a photocoupler 209 ON-OFF controlled by the output of transistor 208. The photocoupler 209 comprises a pair of luminous diodes $210_1$ and $210_2$ connected in series with the transistor 208 and a pair of photoexcited thyristors $211_1$ and $211_2$ connected in parallel across the terminals $B_1$ and $B_2$ and arranged to be excited by the light emitted by the luminous diodes $210_1$ and $210_2$, respectively.

The operation of the microwave oven constructed as above described is as follows. When the source switch 14 is closed, the heating control circuit 45 is energized so that a pulse generator, not shown, generates an initial set pulse which is applied to the input control unit 141 and the control unit of the main control unit 64. Consequently, the input control unit clears or initializes the memory unit 143 and the clock control unit 145 while the control unit 142 clears the arithmetic operating unit 144 and stores (or set) the maximum output data, in this example, a value "99" (continuous oscillation) in the output level memory registers $RS_7$ through $RS_9$ for the first to third stages of the cleared memory unit 143. At the same time, the input control unit 141 clears the status register 149. Consequently, the second display control unit 150 sends a first stage lamp display signal to the display circuit 66 to light the first stage lamp $15_1$ thus to display that application of the data to the first stage is possible. At this time, the second display control unit 150 produces a lamp display (pulse) signal synchronized with the digit signal $D_3$, which is supplied to the lamp drive circuit $174_1$. Since, at this time, the output of the digit drive circuit $172_2$ ON-OFF controlled by the digit signal $D_3$ is supplied to the first stage lamp $15_1$ the lamp drive circuit $174_1$ lights the first stage lamp $15_1$ in respone to the applied lamp display signal.

To use the main control unit 64 as a clock, the time is set in the following manner. The clock key 12 is depressed first and then the clear key. Then the input control unit 141 supplied with the key signal detects it and transfers the data (at this time "0") in the clock control unit 145 to the first display control unit 146 for waiting the data input from the ten-key unit 10. By sequentially applying data regarding the interval by the ten-key unit 10, the input control unit 141 sequentially reads the data and transfers the encoded data to the clock control unit 145 and the first display control unit 146. Consequently, the first display control unit 146 sequentially produces segment signals A through G of respective digits corresponding to the applied numerical data (see interval). These digit signals A through G are applied to respective digit display devices $7_1$ through $7_4$ whereby the digital display unit 7 displays the set data (time). For example, where keys 1→0→2→4 of the ten key unit 10 are depressed sequentially, a time of 10 o'clock 24 minutes is set which is displayed by the digital display unit 7 as shown in FIG. 5b. At this time, when the clock key 12 is depressed again, the clock operation is commenced and the colon display member of the digital display unit 7 flickers once per second thus showing that the clock operation has started. More particularly, when the clock key 12 is depressed again, the input control unit 141 sends a clock initiation signal to the status register 149. The control unit 142 detects this signal and transfers the input data (set time) in the clock control unit 145 to the arithmetic operating unit 144 to check whether its input data is correct or not. If correct, the clock initiation signal would be transferred to the clock control unit 145. While the clock control unit 145 starts its operation at this time, thereafter it adds hours and minutes in response to a reference pulse of one minute generated by the clock generating unit 148. When the clock generating unit 148 starts, since a clock initiation signal is stored in the status register 149, the second display control unit 150 produces a colon display signal in this case flicker signal, synchronous with the reference time pulse of one second generated by the clock generating unit 148, and transfers the colon display signal to the colon drive circuit 173 of the display circuit 66, whereby the colon display member $7_5$ flickers with a period of one second.

Where the input data is not correct at the time when it is checked, the control unit 142 sends an error set signal to the first display control unit 146 to cause it to supply a flashing signal to the erroneously set digit of the display circuit. For example, if an erroneous time of 10 o'clock 96 minutes were set, immediately after depression of the clock key 12, segment signals A through G corresponding to the data (in this example the second digit 9) erroneously set by the second display control unit 146 would be interrupted at a definite period to cause the digital display unit 7 to flash the second digit "9" thus informing the erroneous setting to the operator.

When door 3 is opened to dispose the foodstuff in the heating chamber 2, the movable contact 33c of the door switch 33 engages the stationary contact 33b. Thus relay 36 is energized to throw its movable contact $36_2$ to the stationary contact $36_{2a}$ whereby the cabinet lamp 52 is lighted to illuminate the inside of the heating chamber 2. After putting the foodstuff 5 in the heating chamber 2, the door 3 is closed to operate the door switch 33 for deenergizing relay 36 and lamp 52. During this operation, the digital display unit 7 continues to display time.

As a simplest example (hereinafter termed "example A") a case wherein only the heating period is taken as a parameter for determining the operation of the oven will be considered. As above described, after putting the foodstuff 5 in the heating chamber 2 and closing the door 3, the time key 24 is depressed. Then the interval display of the digital display unit 7 becomes [0] showing that the setting of the heating time is possible. More particularly, as the time key 24 is depressed, the input control unit 141 judges which one of the time key of the stage has been depressed (in this case the first stage), and transfers the time data (at this time "0") stored in the register RS$_1$ of the memory unit 143 corresponding to that stage to the first display control unit 146 for waiting the next data input applied by the ten key unit 10. Then, the first display control unit 146 produces a segment signal A through G corresponding to the numerical valve [0] thus causing the digital display unit 7 to display [0]. By sequentially applying numerical values (time) by the ten key input unit 10, the input control unit 141 reads these values and transfers encoded numerical values, or time data to the register RS$_1$ of the memory unit 143 and to the first display control unit 146. Consequently, the memory unit 143 stores the time data and sequentially sends out to respective digits segment signals A through G corresponding to the supplied numerical value data (set time). In response to the segment signals, the digital display unit 7 displays the set time. Thus, for example keys of the ten key unit 10 are depressed in the order of 1→5→3→0 the digital display unit 7 displays the set time 15 minutes 30 seconds as shown in FIG. 5a.

When the start key 13 is depressed at this time, the input control unit 141 detects this and sends a start signal to the status register 149. In response to this signal the control unit 142 sequentially transfers the input data (set time) in the register RS$_1$ to the arithmetic operation unit 144 to check whether the input data is correct or not. If correct, the operation of the microwave oven would be started. In this example, since the operation is a timer operation, it will be described hereunder. At the start, since all data are judged to be correct, the control unit 142 sends an electromagnetic contactor drive instruction to the output control unit 147. In response to this instruction, the output control unit 147 supplies an electromagnetic contactor drive signal to the output circuit 68 for energizing the electromagnetic contactor drive circuit 201. At this time, since the lock switch 50 is closed, the electromagnetic contactor 51 is energized to close its main contacts 51$_1$ and 51$_2$. Furthermore, as the relay 36 is not energized at this time, the fan motor 48 is energized and the cabinet lamp 52 is also lighted. At this time, the output control unit 147 sends a clock display signal to the display circuit 66 so that the lamp drive circuit 174$_3$ of the display circuit 66 lights the clock lamp 18.

Then, the control unit 142 reads out an output level data (at this time set to a maximum value "99") from the register RS$_7$ of the memory unit 143 and sends this data to the arithmetic operation unit 144 for encoding the data thus instructing the output control unit 147 to heat the foodstuff by the corresponding output level. In response to this instruction, the output control unit 147 sends to the output control circuit 67 an output control signal (a continuous ON signal since in this case at a maximum output level) so that the switching circuit 181 of the output control circuit 67 commences the ON-OFF operation (in this case a continuous ON operation) corresponding to the output control signal supplied. As a consequence, the magnetron 42 oscillates to begin the heat cooking. At the same time, the control unit 142 transfers the data (set time) in the registers RS$_1$ of the memory unit 143 to the arithmetical operation unit 144 to cause it to perform 60 digit down count each time a reference time pulse of one second is generated by clock generating unit 148. The down counted data is applied again to the register RS$_1$ of the memory unit 143 (thus rewriting the content) and at the same time this data is sent also to the first display control unit 146 whereby the first display control unit 146 sequentially sends out the segment signals A through G corresponding to the applied data. Accordingly, since the digital display unit 7 sets a time of 15 minutes 30 seconds, the displayed content changes as [15:30]→[15:29]→[15:28] . . . Different from the time display, the colon display member 7$_5$ does not flicker at this time but is controlled to be continuously luminescence. As above described, when the start key 13 is depressed, each time when the display time of the digital display unit 7 is decreased one second, magnetron 42 oscillates to start heat cooking of the foodstuff. The cabinet lamp 52 is lighted to show the cooking condition, and the cook lamp 18 is also lighted.

When the data becomes "0" by the repeated down counting of the time data (set time) at the arithmetic operation unit 144, the control unit 142 detects this and sends an electromagnetic contactor OFF instruction, an output control circuit OFF instruction, and a buzzer drive instruction to the output control unit 147. In response to these instructions, the output control unit 147 stops the application of the cook display signal to the display circuit 66, the electromagnetic contactor drive signal to the output circuit 68, and the output control signal to the output control circuit 67 but applies a buzzer drive signal to the output circuit 68 for a definite interval, for example 5 seconds. Accordingly, the output control circuit 67 ceases its ON-OFF operation, but the buzzer drive circuit 202 of the drive circuit 65 is energized for the definite interval. On the other hand, since the buzzer drive signal is supplied at this time, the electromagnetic contactor drive circuit 201 is maintained in the energized condition. As a consequence, the magnetron 42 stops oscillation and the cook lamp 18 is also deenergized, whereas the buzzer 53 is operated for a definite time. At this time, the buzzer drive signal is stopped, and the electromagnetic contactor drive circuit 201, and hence the contactor 51, fan 48 and the cabinet light 52 are also deenergized. At this time, when the time data becomes "0", the control unit 142 sends an initializing signal for the memory unit 143 and the first display control unit 146 of the input control unit 141 through the status register 149, thus stopping the operation of the control unit 142. In response to the initializing signal, the input control unit 141 initializes the memory unit 143 and the first display control unit 146. Consequently, all display contents of the digital display unit 7 are erased (zero is not displayed). Irrespective of the erasure of the display, as the clock control unit 145 is operating independently, the function of the clock is still continued. As above described, the time data is sequentially subtracted and the digital display unit 7 displays the remaining time of the set time, but at an instant when the remaining time becomes [0], the display is erased. At the same time, the oscillation of the magnetron 42 is stopped, cook lamp 18 is extinguished and the buzzer 53 is operated for a definite time thus informing the operator that the cooking has been completed. The cabinet lap 52 is also extinguished together with the buzzer 53.

As a more complicated example another operation will be described hereunder in which a time heating function (first stage) effected by the combination of time and output level, heating function (second stage) effected by the combination of the temperature and the output level, and a temperature preserving function (third stage) effected by the combination of the time and temperature, are sequentially performed, and in addition a preset function (preset stage) is effected in which the heat cooking is started from a desired time. At first, the plug P of the temperature detection probe 4 is inserted into the jack J on the inner wall of the heating chamber 2 for detecting the temperature of the foodstuff 5 and the temperature detection probe 4 is inserted into the foodstuff 5. Then, the plug-in detection circuit 70 of the temperature detection unit 63 produces a plug-in detection signal which is supplied to the control unit 142 of the main control unit 64 and to the lamp drive circuit $174_2$ of the display circuit 66. Accordingly, control unit 142 recognizes that the temperature detection probe has been connected. At the same time, the plug-in lamp 16 is lighted to display that the temperature detection plug 4 has inserted.

After inserting the temperature detection probe 4 into the foodstuff 5 and after closing the door 3, the time key 24 is depressed and then the ten key unit 10 is operated to apply the numerical value (time) in the same manner as in example A to store the input data, that is the time data in the register $RS_1$ of the memory unit 143 and to display the set time by the digital display unit 7. Then, the output level key 22 is depressed, so that the input control unit 141 judges which one of the output level keys of the stage was depressed (in this case the first stage) thereby transferring the output level data (at this time the maximum value "99") stored in the register $RS_7$ of the memory unit 143 corresponding to that stage to the first display control unit 146 to wait for the receipt of the next numerical value. Consequently, the digital display unit 7 displays the output level data, that is [99] as shown by FIG. 5d. When a numerical value (output level) is applied by the ten key unit 10, the input control unit 141 reads and encodes the numerical value and transfers the encoded value that is the output level data to the register $RS_7$ of the memory unit 143 to be stored therein and to the first display control unit 146. Thus, the digital display unit 7 displays the set numerical value (output level). More particularly, when the keys 5→0 of the ten key unit 10 are sequentially depressed, the digital display unit 7 displays a numerical value [50] thus setting an output level [50]. In this manner, the desired heating time and heating output level for the first stage are set. In other words, operation condition of heating for a preset time with output level [50] is set.

When the memory key 19 is depressed at this time, the input control unit 141 detects it and sends a corresponding signal to the status register 149. Accordingly, the second display control unit 150 sends a second stage lamp display signal to the display circuit 66 thus lighting the second stage lamp $15_2$ (at this time the first stage lamp $15_2$ is extinguished). Whereby a condition in which the data input to the second stage is possible is displayed. At this time, the second display control unit 150 provides to the lamp drive circuit $174_1$ a lamp display signal synchronous with the digit signal $D_4$. At this time, since the output signal of the digit drive circuit $172_3$ which is ON-OFF controlled by the digit signal $D_4$ is applied to the second stage lamp $15_2$, the lamp drive circuit 174, lights the second stage lamp $15_2$ in response to the lamp display signal supplied thereto. Then when the temperature key 23 is depressed, the input control unit 141 judges which one of the temperature key of the stage has been depressed (at this time, the second stage) for transferring the temperature data (at this time "OC") stored in the corresponding register $RS_5$ of the memory unit 143 to the first display control unit 146, thus waiting for the next numerical data input.

Thus, the digital display unit 7 displays said temperature data, that is the numerical data [0] together with a unit character [C] or [f].

When supplied with the numerical value (temperature) from the ten key unit 10, the input control unit 141 encodes the numerical value and supplies the encoded temperature data to the register $RS_5$ of the memory unit 143 and to the first display control unit 146. Accordingly, the memory unit 143 stores the temperature data, and the digital display unit 7 displays the set numerical value (temperature). When the keys of the ten key unit 10 are depressed in the order of 9→0, the digital display unit 7 displays the digits as shown in FIG. 5c thus setting a temperature of 90° C.

When the output level key 22 is depressed the input control unit 141 judges which one of the output level key of the stage has been depressed (at this time, the second stage), and sends to the first display control unit 146 an output level data (at this time, maximum value "99") stored in the register $RS_8$ of the memory unit 143 corresponding to that stage for waiting the next numerical data input. As a consequence, the digital display unit 7 displays the output level data, that is numerical value [99]. When applied with a numerical value (output level) from the ten key unit 10, the input control unit 141 encodes the numerical value and supplies the encoded output level data to the register $RS_8$ of the memory unit 143 and to the first display control unit 146. Thus, the memory unit 143 stores the output level data and the digital display unit 7 displays the set numerical value (output level). In this manner, a desired foodstuff temperature and the heating output level are set for the second stage. In other words, an operation condition is set in which the foodstuff is cooked by the set output level until the foodstuff temperature reaches 90° C.

As the temperature preserving key 21 depressed at this time, the input control unit 141 detects this and sends a corresponding signal to the status register 149. Consequently, the second display control unit 150 sends a third stage lamp display signal to the display circuit 66 to light the third stage lamp $15_3$ (at this time the second stage lamp $15_2$ is extinguished) thus displaying that application of the data to the third stage is possible. In this manner, a lamp display signal synchronous with the digit signal $D_1$ is sent to the lamp drive circuit $174_1$ from the second display control unit 150. At this time, since an output signal of a digit drive circuit $174_2$ which is ON-OFF controlled by the digit signal $D_1$ is sent to the third stage lamp $15_{31}$ the lamp drive circuit $174_1$ lights the third stage lamp 15, in response to the lamp display signal supplied.

Then, the temperature key 23 is depressed in the same manner as the temperature setting for the second stage to apply the numerical value (temperature) by the ten key unit 10 to store the input data, that is the temperature data in the register $RS_6$ of the memory unit 143. At this time, the digital display unit 7 displays the set temperature. In the same manner as in the case of setting temperature for the second stage, the time key 24 is depressed to apply the numerical value (time) by the ten key unit 10 in the same manner as above described for storing the input data, that is the time data in the register $RS_3$ of the memory unit 143 and for displaying the set time by the digital display unit 7. By the operation described above the desired temperature to be preserved (foodstuff temperature) and the desired time for preserving the temperature (heating time) are set for the third stage. Thus, an operation condition is set wherein the temperature of the foodstuff is maintained at the set temperature for a set time.

At this time, when the preset key 20 is depressed, the input control unit detects this and sends a corresponding signal to the status register 149. As a consequence the second display control unit 150 applies a preset lamp display signal to the display circuit 66 thus lighting the preset lamp display signal (at this time the third stage preset lamp 15$_3$ is extinguished) thereby indicating that presetting is possible. Thus, the second display control unit 150 applies a lamp display signal which is synchronized with the digit signal $D_2$ to the lamp drive circuit 174$_1$. At this time, since the output signal of the digit drive circuit 172$_1$ which is ON-OFF controlled by the digits signal $D_2$ is applied to the preset lamp 17 this lamp is lighted in accordance with the lamp display signal supplied to the lamp drive circuit 174$_1$. Furthermore, the depression of the preset key 20 causes the input control unit 141 to transfer the preset time (at this time it is "0") stored in the register RS$_{10}$ of the memory unit 143 to the first display control unit 146 for waiting the next numerical valve input. As a consequence, the digital display unit 7 displays numerical value [0]. When a numerical value (time) is applied by the ten key unit 10 the input control unit 141 sends its encoded value, that is the time data to the register RS$_{10}$ of the memory unit 143 and to the first display control unit 146. Consequently, the memory unit 143 stores the time data and the digital display unit 7 displays the set time. More particularly, when the keys of the ten key unit 10 are depressed in the order of 7→10→0, the digital display unit 7 displays [7:00] thus setting the preset time. Thus, an operation condition is set wherein cooking should be begun from 9 o'clock. At this time, the colon display member 7$_5$ of the display unit 7 is not flickered but controlled to be lighted continuously.

In this manner, when all operating conditions have been set, that is when all data have been given, the start button 13 is depressed. Then, the input control unit 141 sends a start signal to the status register 149. In response to this signal, the control unit sequentially transfers all input data stored in the memory unit 143 to the arithmetic operation unit 144 and checks the data to encode the data showing that what operations (time and temperature) should be made in what stage. The encoded data are stored in the status register 149 and a control signal is sent to the output control unit 147 of the control unit 142 to commence the cooking operation. More particularly, in this example, while the preset stage is firstly executed, the control unit 142 firstly reads out the preset time data (preset time) stored in the register RS$_{10}$ of the memory unit 143 to transfer it to the arithmetic operation unit 144 for judging that whether the transferred data coincides with the inside time, that is the time data in the clock control unit 145 or not. The display of the preset time is continued until a coincidence is reached. When the preset time data coincides with the time data in the clock control unit 145, that is when a set time is reached, the control unit 142 detects the coincidence and begins the control for the first stage. Thus the heat cooking (time heating) corresponding to respective operating conditions for the first stage which are stored in the memory unit is commenced. Again, control similar to that of example A is made. Thereafter, when the time for the first stage becomes [0], that is when the time data (set time) in the register RS$_1$ of the memory unit 143 becomes "0", the control unit 142 detects this condition, and informs the status register 149 of completion of the operation of the first stage. Thereafter the control of the second stage is commenced to begin the heat cooking (temperature heating) corresponding to respective operating condition for the second stage which are set and stored in the memory unit 143. The control of the second stage is made in the following manner.

Since the second stage involves the temperature control, the control unit 142 is supplied with a digital signal that is the temperature data of the foodstuff 5 produced by the temperature detection unit 63 and sends this data to the arithmetic operation unit 144 to convert it into a decimal code. The encoded temperature data is then sent to the first display control unit 146 thereby switching the displayed content of the digital display unit 7 from time display to the temperature display of the foodstuff 5. The control unit 142 causes the arithmetic operation unit 144 to compare the encoded temperature data (detected temperature) with the temperature data (set temperature) stored in the register RS$_5$ of the memory unit 143 thereby controlling the output control circuit 67 through the output control unit 147 until the temperature of the foodstuff 6 reaches the set temperature. In other words, an instruction is applied to the output control unit 147 so as to continue the heating at the preset output level until the set temperature is reached. Thereafter, when the arithmetic operation unit 144 confirms that the temperature of the foodstuff has increased above the preset temperature, the control unit 142 detects this and applies a signal to the status register 149 indicating the completion of the operations of the second stage. Thereafter, the control is transferred to the third stage and heat cooking operations (temperature preserving heating) corresponding to respective operation conditions for the third stage which have been set and stored in the memory unit 143 are started. This control for the third stage is performed as follows.

Since the third stage concerns control of the temperature preservation, the control unit 142 reads out the temperature data (set temperature from the register RS$_6$ of the memory unit 143 and sends the read out data to the arithmetic operation unit 144 for comparison with the temperature data (detected temperature) sent from the control unit 142. When the detected temperature is lower than the set temperature, the control unit 142 detects this and reads out the output level data (in this example, the maximum value "99") stored in the register RS$_9$ of the memory unit 143 for encoding the read out data by the arithmetic operation unit 144 thus providing an instruction to the output control unit 147 requesting heating at the maximum heating level (continuous oscillation). Concurrently therewith, the control unit 142 sends to the first display unit 146 a time data (set time) stored in the register RS$_3$ of the memory unit 143. Consequently, the display content of the digital display unit 7 is changed again to the time display from the temperature display. When the arithmetic operation unit 144 confirms that the temperature of the foodstuff 5 has exceeded the set temperature, the control unit 142 applies an instruction to the output control unit 147 for temporarily interrupting the output control circuit 67. As a consequence, the oscillation of the magnetron 42 is stopped temporarily. When the foodstuff temperature exceeds the preset value, the control unit 142 sends to the arithmetic operation unit 144 the time data (preset time) stored in the register RS$_3$ of the memory unit 143 thus down counting the preset time in the same manner as in example A. Accordingly, the set time displayed by the digital display unit 7 is now decreased second by second thereby displaying the remaining time of the preset time. Once the counting down of the preset time is commenced, the arithmetic operation unit 144 checks the time counts and the temperature data (detected temperature) sent from the control unit 142. Thus, the temperature check is made first and then the time check. When the detected temperature (the foodstuff temperature) becomes lower than the set temperature, the control unit 142 gives an instruction to the output control unit 147 that turns ON again the output control circuit 67. Consequently, the magnetron 42 oscillates again to heat the foodstuff 5. Again, the time check and the temperature check are made and when the detected temperature becomes higher than the set temperature, the output control unit 67 is turned OFF again thereby temporarily stopping the oscillation of the magnetron 42. These series of operations are continued until the set time becomes [0]. When the control unit 142 detects this condition, subsequent operations proceed in the same manner as in Example A and buzzer 53 is operated when all operations are completed.

As above described in the third stage, when the preserving temperature of the foodstuff is lower than the set value, heating is made at the maximum output level and the interval in which the temperature is maintained at the set value is displayed. However, the display is not changed and when the temperature of the foodstuff reaches a predetermined preservation temperature, the heating is stopped temporarily, and the time for preserving the temperature is decreased at each second thus displaying the remaining time. When the foodstuff temperature becomes lower than the preset preservation temperature, heating is resumed. In this manner, the temperature of the foodstuff is maintained at a constant value. Thereafter, as the preset temperature preservation time elapses, all cooking operations are completed and the buzzer 53 informs this to the operator.

As above described, the time-heating function, the temperature-heating function and the temperature preservation heating function are sequentially performed according to various preset operating conditions. Where the functions are desired to be effected individually, the operating condition thereof is set.

Where it is desired to fetch and visually confirm a previously set content, a function key corresponding to the set content desired to be confirmed is depressed only for a stage under operation or being set irrespective whether the stage is now operated or being set. For example, where it is desired to confirm the set time at the time (or during operation) of setting it for the first stage, the time key 24 is depressed and the input control unit 141 judges that what time key of what stage (in this example, the first stage) was depressed so as to read out the time data (set time) stored in the register RS$_1$ of the memory unit 143 corresponding to the stage for sending the read out time data. A predetermined time thereafter (5 seconds, for example) the data of the content which has been displayed until that time is sent again to the first display control unit 146. As a consequence, the digital display unit 7 displays the fetched time data (set time) for a definite time. Where an output level or time was displayed originally, such display is resumed. If the fetched set time is not correct and it is necessary to change it data (time) is again applied by the ten key unit 10 within the display time, for example 5 seconds. Then the input control unit 141 encodes the applied data and sends its to the register RS$_1$ of the memory unit 143 thereby substituting the old content of the register with the new data. In this manner, it is possible to change only the set time without changing other set contents. Such change can be made during cooking in which case cooking is stopped at the time when the ten key unit 10 is operated. More particularly, when the ten key unit 10 is operated in a predetermined time, the input control unit 141 detects this and sends an operation stop signal to the status register 149. In response to this signal, the control unit 142 applies suitable processing to the memory unit 143 and the arithmetic operation unit 144 thus stopping the operation thereof. If the ten key unit 10 were not operated within the predetermined time interval, or when it was operated after the predetermined time, the input control unit 141 ignores its input and the control unit 142 continues its operation. In this case the control of the first control unit 146 is made by the input control unit within the predetermined time, but thereafter by the control unit 142. Subsequent to the stop of the operation, when the start key 13 is depressed again, the control unit 142 repeats again the operations of data check start of the operation.

Confirmation of the present time can be made by operating the clock key 12 irrespective of the fact that the oven is in operation or idle. More particularly, when the cook key 12 is depressed while the oven is idle, the input control unit 141 detects this and read out the time data (present data) stored in the clock control unit 145. The read out time data is sent to the first display control unit 146 and continuously displayed by the digital display unit 7. To erase the time display, a suitable key, for example memory key 19 of the function key unit 9 is depressed. In response to this depression, the input control unit 141 clears the first display control unit 146 for erasing the time display of the digital display unit 7. During cooking, continuous display is not made but the time is displayed for a definite interval (for example 5 seconds) in the same manner as the case of confirming the set content described above, and then the display is returned to the original state.

Where there is error in the set time and set temperature, after operating the start key 13, the input data are checked, the erroneous display digits of the digital display unit 7 are caused to flicker by the same operation as the case of erroneous setting of time and the corresponding lamps of the stage are also caused to flicker thus alarming the erroneous setting to the operator. Where the output level is erroneously set, as there are settable output levels of 0 to 99 steps in this embodiment, where an output level of more than three digits is inadvertently set, the most significant digit is erased by overflow and only two lower digits become effective.

Where a setting in which cooking is impossible is made, for example if temperature heating or heating for temperature preservation were attempted without connecting the temperature detection probe 4, the temperature detection unit 63 would not produce a plug-in detection signal so that the control unit 142 would control the first display control unit 146 so as to flicker the display of [OC] of the digital display unit 7 when the start key 13 is depressed thus informing the operator of the fact that cooking is not possible. In this case, however, since the set content is held, the cooking can be started by merely connecting the temperature detection probe 4 and then depressing the start key 13.

When door 3 is opened during cooking, the lock switch 46 interlocked with the door handle is opened prior to the opening of the door switch 33 and applies a signal to the control unit 142. Thus, the control unit 142 detects the opening of the door, and where there is a stage now being executed and succeeding stages, the control unit interrupts the operation while maintaining the contents thereof at that time. In this case, however, the operation can be continued by closing again the door 3 and then depressing the start key 13.

The function key unit 9, the ten key unit 10, the clear key 11, the cook key 12 and the start key 13 may be mechanical key switches or electronic touch switches. Also the arrangement of the component parts is not limited to the illustrated arrangement. Other changes and modifications are also possible within the scope of the invention.

As above described according to this invention it is possible to perform individually or sequentially, the time-heating function effected by the combination of the set time and the output level, the temperature-heating function effected by the combination of the set temperature and the output level, temperature-preserving function effected by the combination of the set temperature and the time by merely setting such operating conditions as the heating time, the heat output level and the foodstuff temperature. Moreover, it is possible not only to set the operating conditions by simple operations but also to digitally display the contents of the settings so that it is possible to eliminate the defects of the prior art encountered in the adjustment, operation and handling, and conveniently to control the oven while observing the operating conditions of various functions. Moreover, since all controls are ade digitally, it is possible to provide an electronic oven capable of controlling correctly and smoothly at high accuracies.

What is claimed is:

1. A microwave oven comprising:
   a casing;
   a heating chamber provided in the casing;
   a door provided at an opening of the heating chamber;
   a magnetron for supplying a microwave energy to the heating chamber;
   a source circuit for energizing the magnetron;
   key means provided at the front panel of the casing and including numeral keys, function keys including a time key for setting or changing at least a selected cooking time, a temperature key for setting or changing selected temperature in a cooking operation, a power level key for setting or changing power levels which control cooking speed, a "heat & hold" key for setting a temperature level to be held for a selected time period, a memory key for selecting more than one stage of cooking operations prior to starting the oven so that cooking automatically progresses from one stage to the next, a start key for starting a selected cooking operation and a clear key for stopping oven operation and clearing a prior selected cooking operation;
   digital control logic means for encoding an operation condition determined in response to the operation of the function keys and numeral keys in said key means selectively operated by users, which comprise a key circuit and an input control unit including a key encoder for encoding an output signal of said key circuit and a key ROM supplied with the output of said key encoder;
   memory means having at least three memory areas for memorizing the encoded operation condition regarding the time, temperature and power level encoded by the digital control logic means, respectively;
   display means for displaying digitally the operation condition encoded by said digital control logic means;
   operation means for initiating an operation in response to the operation of said start key to energize said magnetron based on the operation condition memorized in said memory means, which includes an oscillator, a timing signal generator supplied with the output of said oscillator, and a main ROM connected to memorize a predetermined program, a status register connected to said key ROM and said main ROM, a first display control unit connected to receive the output of said status register, a second display control unit connected to said memory means, a display circuit for supplying the outputs of said first and second display control units to said display means;
   said second display control circuit comprising a control gate with controls interchange of data between said key ROM and said main ROM, a display register and a half adder which are supplied with the output of said control gate, a latch circuit supplied with the output of said display register, and a segment decoder for decoding the output of said latch circuit; and
   control means for controlling said source circuit in response to an output signal of said operation means.

2. The microwave oven according to claim 1 further comprising a clock generating means for generating clock data.

3. The microwave oven according to claim 2 wherein said key means include a clock key.

4. The microwave oven according to claim 3 wherein said key means further include a "preset" function key, and said memory means include a memory area corresponding to the "preset" function key.

5. The microwave oven according to claim 2 wherein said operation means further comprises a clock control unit receiving the output of said clock generating means, and said digital control logic means operate under the control of said clock control unit.

6. The microwave oven according to claim 1 further comprising means for detecting the temperature of foodstuffs at a time the "temp" key of said key means is operated.

7. The microwave oven according to claim 6 wherein said foodstuff temperature detecting means comprises a temperature detection probe adapted to be inserted into said foodstuff.

8. The microwave oven according to claim 6 wherein said temperature detection probe comprises a thermistor.

9. The microwave oven according to claim 6 which further comprises a linearizing circuit which compensates for a nonlinear voltage.

10. The microwave oven according to claim 6 wherein said temperature detecting means comprises an A/D converter which converts an analog input thereof into a digital signal, and a sampling circuit for sampling the output of said A/D converter at predetermined times and supplying the sampled output to said arithmetic operation unit.

11. The microwave oven according to claim 10 wherein said sampling circuit samples the output of said A/D converter at a rate of once per second.

12. The microwave oven according to claim 1 wherein said display means comprises means for displaying C or F by a righthand digit and for displaying the detected foodstuff temperature in decimal values when displaying temperature.

13. The microwave oven according to claim 1 wherein said display means comprise means for displaying a preset heat output level by a decimal value of from 0 to 99 by using two righthand display digits.

14. The microwave oven according to claim 1 in which said operation means includes means for delivering an output to said control means when a predetermined temperature is exceeded during the "heat and hold" key operation.

15. The microwave oven according to claim 1 in which said operation means includes means for delivering an output to said control means after the magnetron is de-energized subsequent to magnetron energization effected during a previous temperature operation mode, so that the said magnetron can be re-energized when the temperature of the foodstuff being heated drops below a predetermined temperature during a "heat and hold" operation mode set by the "heat and hold" key.

* * * * *